(12) United States Patent
Graham et al.

(10) Patent No.: US 10,190,334 B2
(45) Date of Patent: Jan. 29, 2019

(54) ADJUSTABLE LENGTH CABLE

(71) Applicant: Schlage Lock Company LLC, Carmel, IN (US)

(72) Inventors: Matthew S. Graham, Noblesville, IN (US); Justin Wenger, Carmel, IN (US); Michael D. Coleman, Noblesville, IN (US); Yong Kwan Lacy, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 119 days.

(21) Appl. No.: 15/342,773

(22) Filed: Nov. 3, 2016

(65) Prior Publication Data

US 2017/0122364 A1    May 4, 2017

Related U.S. Application Data

(60) Provisional application No. 62/250,279, filed on Nov. 3, 2015.

(51) Int. Cl.
*E05B 17/00* (2006.01)
*E05B 65/10* (2006.01)
(Continued)

(52) U.S. Cl.
CPC ........ *E05B 17/0004* (2013.01); *E05B 53/005* (2013.01); *E05B 65/10* (2013.01);
(Continued)

(58) Field of Classification Search
CPC .. F16C 1/22; F16C 1/226; F16C 1/223; F16C 1/262; F16C 1/12; F16C 1/14;
(Continued)

(56) References Cited

U.S. PATENT DOCUMENTS 4,838,110 A   6/1989 Koukal et al.
4,854,186 A   8/1989 Jakob et al.
(Continued)

FOREIGN PATENT DOCUMENTS

GB          898208 A  *  6/1962  ............. F16C 1/262

OTHER PUBLICATIONS

International Search Report; US Patent and Trademark Office; International Application No. PCT/US2016/060347; dated Mar. 13, 2017; 4 pages.

(Continued)

*Primary Examiner* — Thomas C Diaz
(74) *Attorney, Agent, or Firm* — Taft Stettinius & Hollister LLP

(57) ABSTRACT

An adjustable length cable system that can be used in association with transmission of an axial pulling force. The cable system, which can be concealed within and/or behind a structure such as, for example, within an interior region of an entryway device, can accommodate adjustments in the axial lengths of a core wire and a conduit system of the cable system. The core wire can extend through, as well as beyond, the conduit system, and be connected to end fittings and/or connectors that can be used to transmit a pulling force to and/or from one or more components. In some embodiments, the conduit system can include an inner conduit telescopically coupled to an outer conduit such that the axial length of the conduit system is adjustable. Further, the relative axial positions of the inner and outer conduits may be retained by activation of a conduit locking device.

19 Claims, 13 Drawing Sheets

(51) Int. Cl.
   *F16C 1/12* (2006.01)
   *F16C 1/14* (2006.01)
   *F16C 1/22* (2006.01)
   *F16C 1/26* (2006.01)
   *E05B 53/00* (2006.01)
   *E05C 9/04* (2006.01)

(52) U.S. Cl.
   CPC .................. *E05C 9/04* (2013.01); *F16C 1/12* (2013.01); *F16C 1/14* (2013.01); *F16C 1/223* (2013.01); *F16C 1/262* (2013.01)

(58) Field of Classification Search
   CPC .. F16L 33/224; E05B 17/0004; E05B 53/005; E05B 65/10; E05C 9/04
   See application file for complete search history.

(56) References Cited

U.S. PATENT DOCUMENTS

| | | | |
|---|---|---|---|
| 5,036,725 A | 8/1991 | Troiano | |
| 5,575,180 A | 11/1996 | Simon | |
| 5,598,743 A | 2/1997 | Yasuda | |
| 5,613,405 A | 3/1997 | Kelley et al. | |
| 5,632,182 A | 5/1997 | Reasoner | |
| 5,653,148 A | 8/1997 | Reasoner | |
| 5,664,462 A | 9/1997 | Reasoner | |
| 5,682,797 A | 11/1997 | Kelley et al. | |
| 5,702,196 A | 12/1997 | Petercsak | |
| 5,746,094 A | 5/1998 | Medebach et al. | |
| 5,839,325 A | 11/1998 | Daumal Castellon | |
| 5,868,038 A | 2/1999 | Bravo | |
| 5,907,978 A | 6/1999 | Malone et al. | |
| 5,913,944 A | 6/1999 | Haynes et al. | |
| 5,927,892 A * | 7/1999 | Teh-Tsung ........... H02G 3/0675 285/322 | |
| 5,973,264 A | 10/1999 | O'Connor | |
| 6,014,910 A | 1/2000 | Oda et al. | |
| 6,093,892 A | 7/2000 | Arimoto | |
| 6,223,622 B1 | 5/2001 | Ficyk et al. | |
| 6,301,992 B1 | 10/2001 | Paparoni | |
| 6,401,565 B1 | 6/2002 | Wang et al. | |
| 6,405,613 B1 | 6/2002 | Lim | |
| 6,416,022 B1 | 7/2002 | Crespi | |
| 6,561,057 B2 | 5/2003 | Cebollero | |
| 6,606,921 B2 | 8/2003 | Noetzold | |
| 6,646,204 B2 | 11/2003 | Chaon et al. | |
| 6,807,879 B2 | 10/2004 | Reynolds et al. | |
| 6,820,905 B1 | 11/2004 | Haeck et al. | |
| 6,884,481 B1 | 4/2005 | Reynolds et al. | |
| 6,898,996 B2 | 5/2005 | Freund et al. | |
| 7,007,350 B1 | 3/2006 | Franke | |
| 7,055,656 B2 | 6/2006 | Drew | |
| 7,140,476 B2 | 11/2006 | Hilss et al. | |
| 7,146,875 B2 | 12/2006 | Gordy et al. | |
| 7,222,459 B2 | 5/2007 | Taniyama | |
| 7,347,465 B2 | 3/2008 | Jayasuriya et al. | |
| 7,530,288 B2 | 5/2009 | Ruhlander | |
| 7,609,924 B2 | 10/2009 | Anderson et al. | |
| 7,650,814 B2 | 1/2010 | Watarai | |
| 7,677,499 B2 | 3/2010 | Seaver | |
| 7,748,327 B2 | 7/2010 | Suzuki | |
| 7,748,757 B2 | 7/2010 | Shen | |
| 7,770,489 B2 | 8/2010 | Ruhlander | |
| 7,784,376 B2 | 8/2010 | Wen | |
| 7,887,107 B2 | 2/2011 | Shen | |
| 7,956,289 B2 | 6/2011 | Morimoto et al. | |
| 8,066,246 B2 | 11/2011 | Bishop | |
| 8,079,286 B2 | 12/2011 | Nagle et al. | |
| 8,082,694 B2 | 12/2011 | Azuma | |
| 8,100,032 B2 | 1/2012 | Boehm | |
| 8,146,455 B2 | 4/2012 | Ruhlander | |
| 8,215,202 B2 | 7/2012 | Tomandl | |
| 8,245,379 B2 | 8/2012 | Ruhlander | |
| 8,266,981 B2 | 9/2012 | Gordy | |
| 8,312,788 B2 | 11/2012 | Kwon | |
| 8,356,530 B2 | 1/2013 | Hasegawa et al. | |
| 8,444,644 B2 | 5/2013 | Ross et al. | |
| 8,448,669 B2 | 5/2013 | Wen | |
| 8,485,062 B2 | 7/2013 | Chiou | |
| 8,497,427 B2 | 7/2013 | Wen | |
| 8,516,921 B2 | 8/2013 | Gordy | |
| 8,534,719 B2 | 9/2013 | Chow | |
| 8,607,661 B2 | 12/2013 | Geisler | |
| 8,646,355 B2 | 2/2014 | Lee et al. | |
| 8,671,797 B2 | 3/2014 | Piccinali | |
| 8,763,492 B2 | 7/2014 | Howe et al. | |
| 8,795,311 B2 | 8/2014 | Griffith et al. | |
| 8,850,920 B2 | 10/2014 | Koontz et al. | |
| 8,850,921 B2 | 10/2014 | Ma | |
| 8,857,288 B2 | 10/2014 | Sano et al. | |
| 8,955,408 B2 | 2/2015 | Tarver | |
| 9,038,496 B2 | 5/2015 | Horinaka et al. | |
| 9,091,296 B2 | 7/2015 | Bernhardt et al. | |
| 9,121,439 B2 | 9/2015 | Schimings et al. | |
| 9,160,220 B2 | 10/2015 | Cavalcante | |
| 9,290,268 B2 | 3/2016 | Ratti et al. | |
| 2003/0005681 A1 | 1/2003 | He et al. | |
| 2003/0220165 A1 | 11/2003 | He et al. | |
| 2013/0186369 A1 | 7/2013 | Kobayashi | |
| 2014/0135764 A1 | 5/2014 | Ross et al. | |
| 2014/0216198 A1 | 8/2014 | Kariyama et al. | |
| 2014/0251062 A1 | 9/2014 | Snodgrass | |

OTHER PUBLICATIONS

Written Opinion of the International Searching Authority; US Patent and Trademark Office; International Application No. PCT/US2016/060347; dated Mar. 13, 2017; 6 pages.

98/9949 Installation Instructions; Von Duprin; retrieved from internet on Dec. 15, 2016 <URL=https://web.archive.org/web20150910110727/http://us.allegion.com/IRSTDocs/InstallInstructions/105677.pdf>; 2014; entire document, especially "2-Point Latch includes these additional parts"; p. 1 and Box 2: Install Cable(s), p. 2.

* cited by examiner

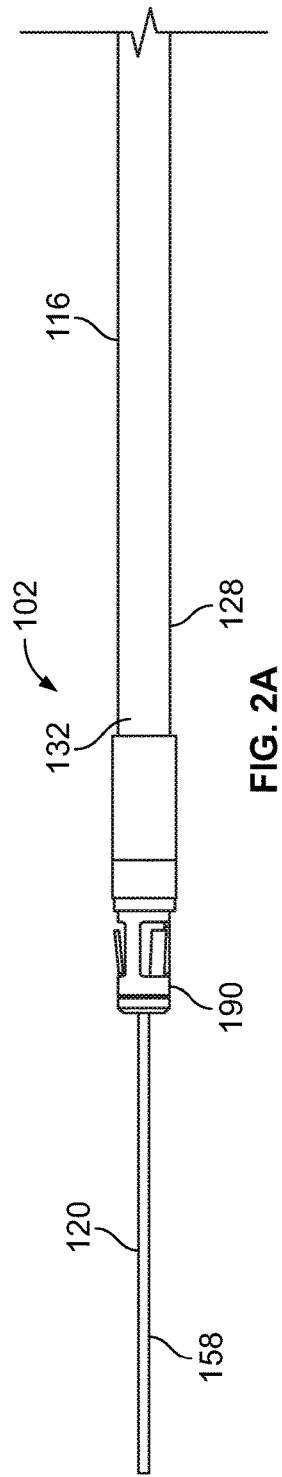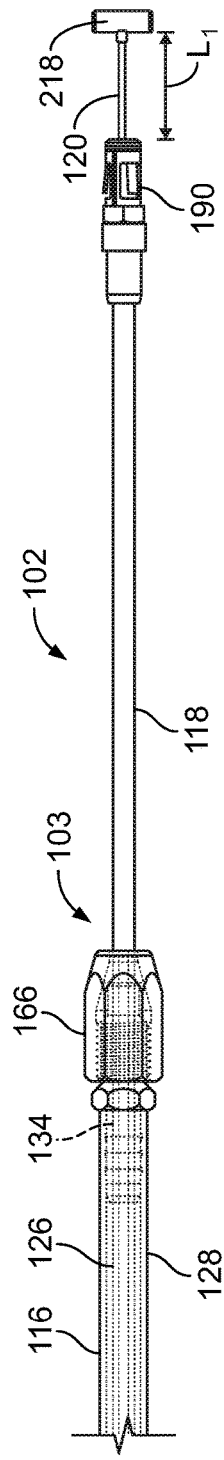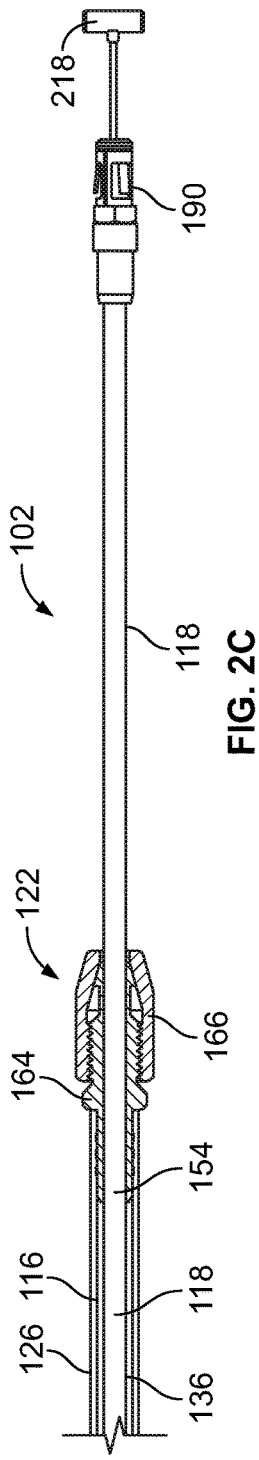

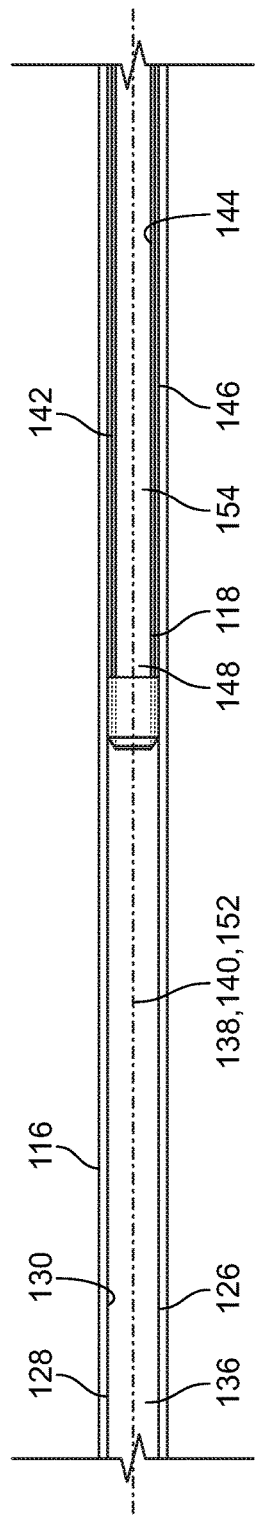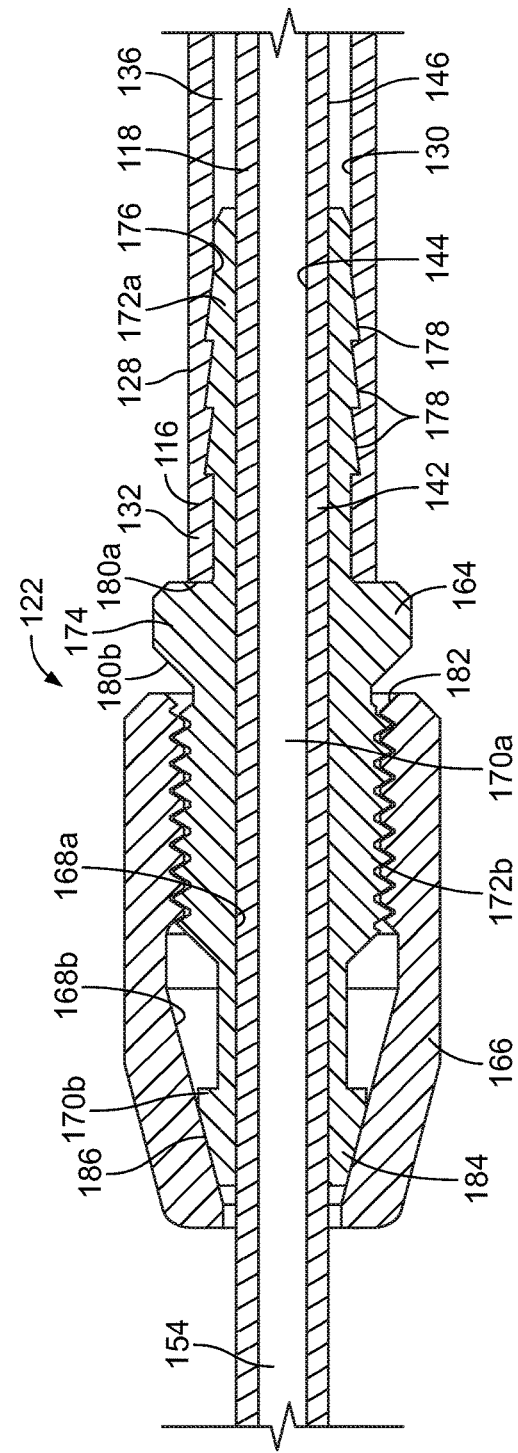

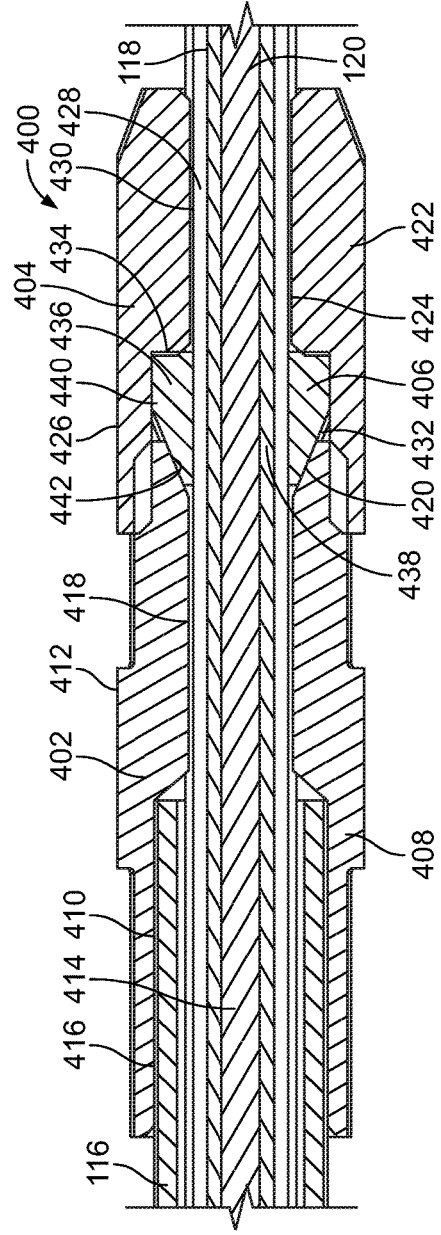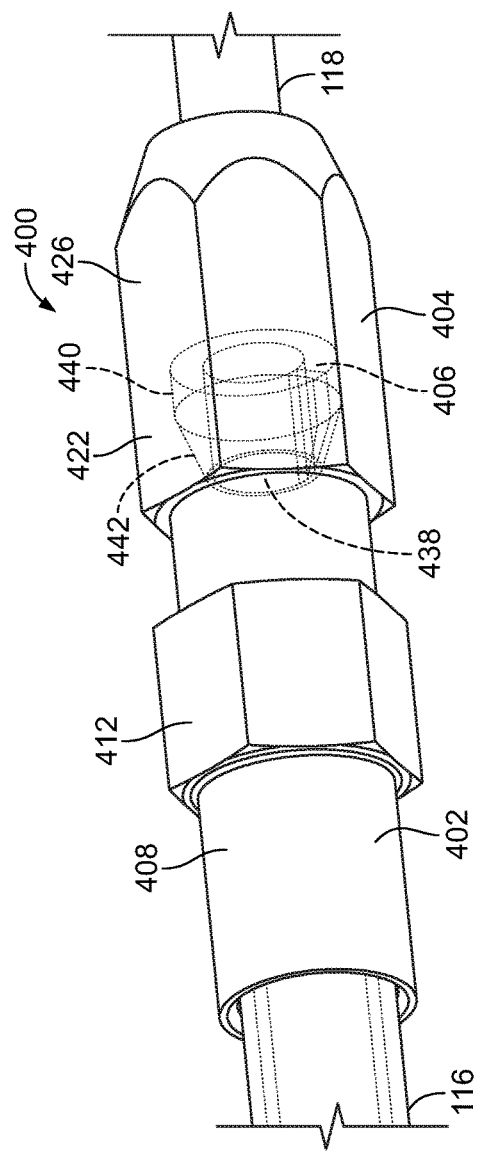
FIG. 5A
FIG. 5B

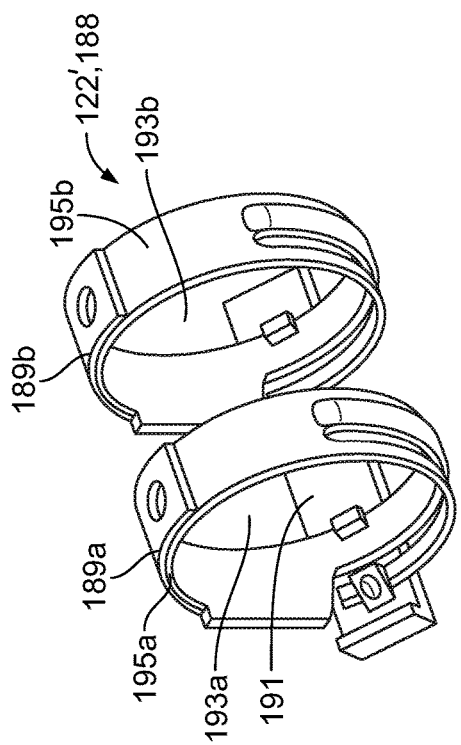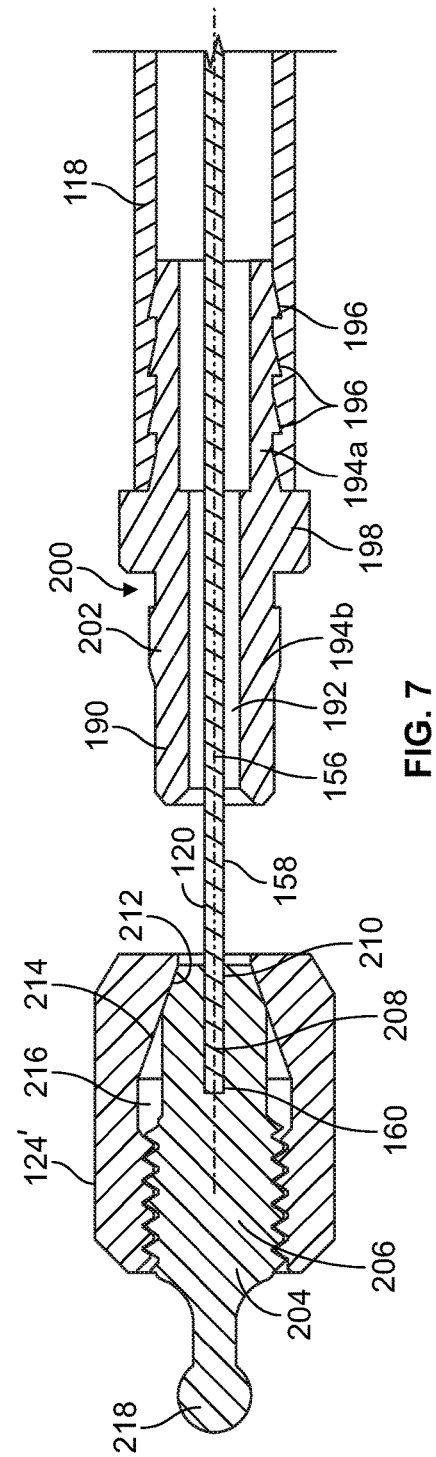

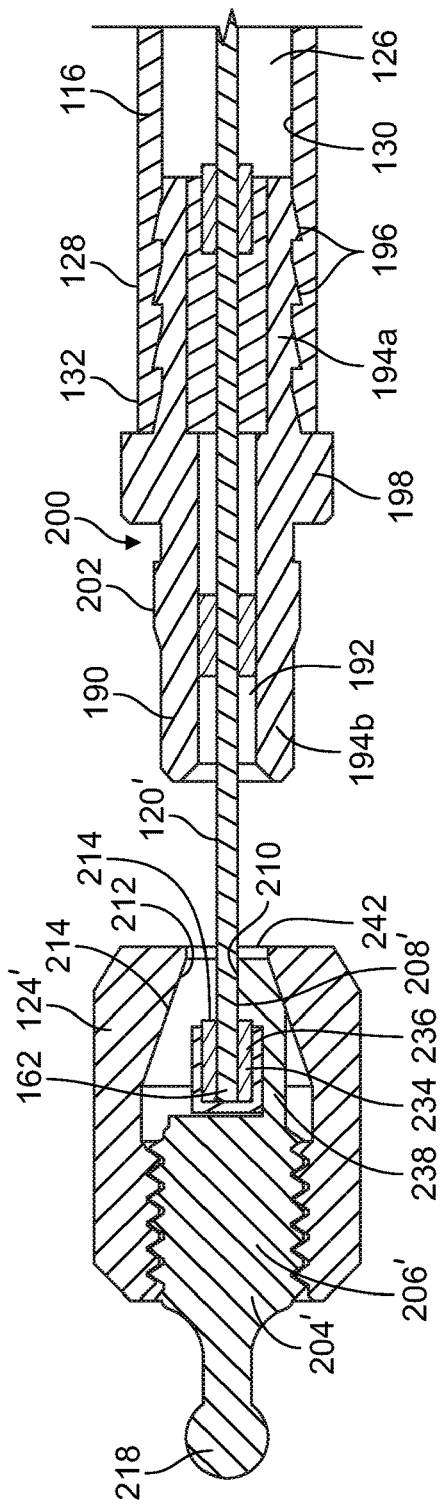
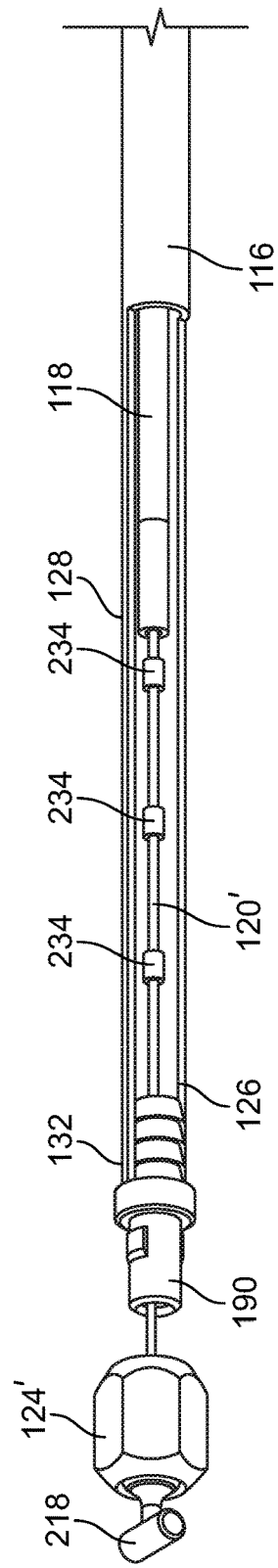
FIG. 8A
FIG. 8B

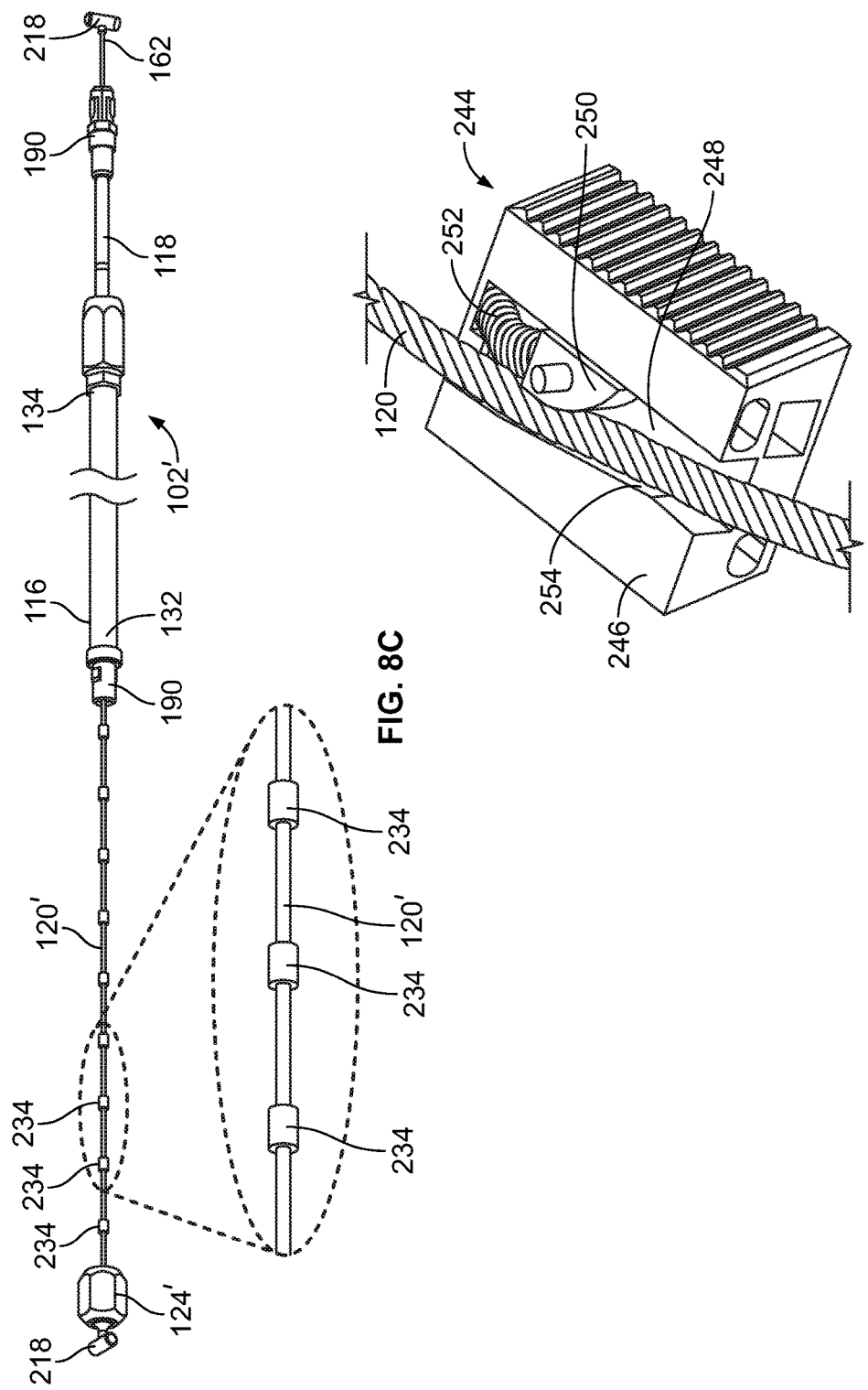

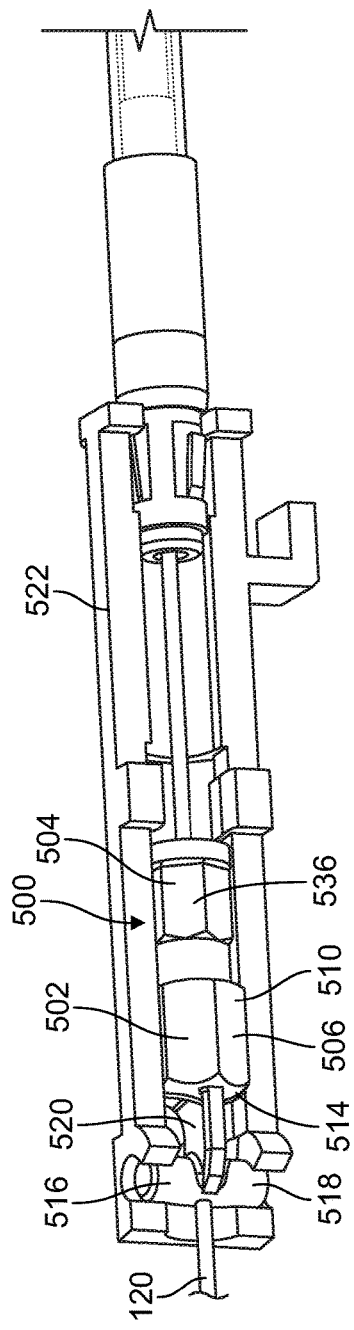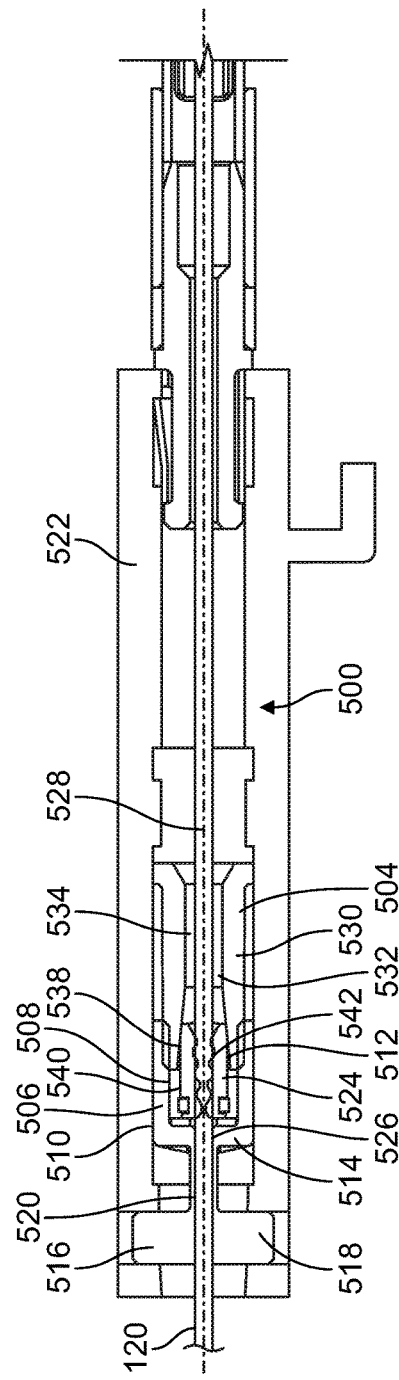

ADJUSTABLE LENGTH CABLE

CROSS REFERENCE TO RELATED APPLICATIONS

The present application claims the benefit of U.S. Provisional Patent Application Ser. No. 62/250,279 filed Nov. 3, 2015, the contents of which are incorporated herein by reference in their entirety.

BACKGROUND

Embodiments of the present application generally relate to cables used to at least transmit an axial force. More particularly, but not exclusively, embodiments of the present application relate to adjustable length concealable cables that can be used in the transmission of an axial pulling or pushing force.

Cables, which can include wires, ropes, chains, and cords, among other devices, elements or apparatuses, can be utilized in a variety of different applications for transmitting an axial force between two or more components, including, but not limited to, the transmission of an axial pulling force. For example, in some applications, one or more cables may be used with exit devices of entryway devices, such as, for example, exit devices used to control the opening of doors and gates. For example, according to some applications, when a closed entryway device is to be displaced to an open position, a push bar of an exit device can be activated, such as, for example, by being depressed. Such linear displacement of the push bar can be translated to an axial force by a cable that, directly or indirectly, pulls on top and/or bottom latch(es) and/or latch bolt(s). Moreover, the cable(s) can transmit a pulling force on the latch bolt(s) that axially displaces the latch bolt(s) generally away from an extended, locked position in a door frame or adjacent wall, and to a retracted, unlocked position. Further, in at least some embodiments, the retracted latch bolt(s) may later be returned from the retracted, unlocked position to the extended, locked position, such as, for example, by a force provided by a biasing element, including but not limited to a spring. Such return of the latch bolt(s) to the extended, locked position can result in the latch bolt(s) axially pulling the cable(s) in a linear direction generally away from the exit device.

In such embodiments, the cable can be provided with a length that ensures the cable translates a pulling force to axially displace latch bolt(s) from the extended, locked position to the retracted, unlocked position with at least relatively minimal linear displacement of the push bar. Further, the cable can also be sized to have a length that prevents the cable from interfering with, or otherwise preventing, the latch bolt(s) from subsequently returning from the retracted, unlocked position to the extracted, locked position. Accordingly, in these and other applications, operation of the associated components, such as, for example, the exit device and latch bolt(s), can depend, at least in part, on the cable having a relatively precise and/or accurate length.

In at least some industries, to accommodate different characteristics of a system or particular installations, such cables may be offered in a variety of different lengths. For example, with respect to entryway devices, cables used to displace latch bolts are offered in a variety of lengths to accommodate a particular door height. Yet, such an approach often results in an installer maintaining an inventory of different length cables, which can in turn increase the cost and complexity of the associated installation. Further, in at least some situations, despite having the option of selecting from multiple cable lengths, some installations may require that the length of the cable be adjusted. Yet, such adjustments are often irreversible, which can, in at least some situations, prevent both subsequent adjustments in the length of the cable and fine tuning of the cable length, which can adversely impact the quality of the installation and operation of the associated component, device, or system.

BRIEF SUMMARY

One aspect of the present application is directed to an apparatus that includes an inner conduit having an inner aperture and an outer conduit having an outer aperture. The outer aperture is sized to accommodate telescopic displacement of at least a portion of the inner conduit within at least a portion of the outer aperture. The apparatus further includes a core wire that extends through the inner aperture and at least a portion of the outer aperture. Additionally, a first end of the core wire extends from a first end of the outer conduit, while a second end of the core wire extends from a second end of the inner conduit. Further, one of the first and second ends of the core wire can be coupled to a first connector. The apparatus can also include a conduit locking device that is structured to selectively secure relative axial positions of the inner conduit and the outer conduit.

Another aspect of the present application is directed to an apparatus having a conduit system comprising at least a first conduit that is telescopically coupled to a second conduit, with an axial length of the conduit system being adjustable between a first axial length and a second axial length. Additionally, a core wire can extend through the conduit system, and with a first end of the core wire being coupled to a first connector. The apparatus further includes a conduit locking device that is structured to selectively secure the conduit system at one of a plurality of axial lengths between the first and second axial lengths, inclusive.

Another aspect of the present application is directed to an apparatus comprising a first conduit having a first wall, a first end, and a second end, with the first wall having an outer surface and an inner surface. The inner surface of the first wall can generally define a first aperture of the first conduit. Additionally, a first end of the first conduit can be coupled to a first conduit adapter. The apparatus further includes a second conduit having a second wall, a first end, and a second end. At least a portion of the second wall adjacent to the first end of the second conduit can be sized for slideable displacement along the first aperture. Further, the second end of the second conduit can be coupled to a second conduit adapter. The apparatus also includes a conduit locking device that is coupled to the first end of the first conduit and structured to secure an axial position of the second conduit relative to the first conduit. The apparatus can further include a core wire that extends through the first and second conduits, a first end of the core wire extending beyond the first end of the first conduit, and a second end of the core wire extending beyond the second end of the second conduit.

BRIEF DESCRIPTION OF THE DRAWINGS

The description herein makes reference to the accompanying figures wherein like reference numerals refer to like parts throughout the several views.

FIGS. 2A and 2B illustrate partial side views of opposite portions of an exemplary cable system according to an illustrated embodiment of the present invention.

FIG. 2C illustrates a partial cross sectional view of the portion of the cable system depicted in FIG. 2B.

FIG. 3 illustrates a side cross sectional view of a portion of an inner conduit positioned within a portion of an outer aperture of an outer conduit of the exemplary cable system depicted in FIGS. 2A-2C.

FIG. 4 illustrates a side cross sectional view of an exemplary conduit locking device coupled to both a first end of an outer conduit and a portion of an inner conduit of the exemplary cable system depicted in FIGS. 2A-2C.

FIGS. 5A and 5B illustrate a cross sectional view and a partial phantom side perspective view, respectively, of an exemplary conduit locking device.

FIG. 6 illustrates an exemplary conduit locking device in the form of a spring clamp that is configured to secure the relative axial positions of at least two conduits of a cable system.

FIG. 7 illustrates a side cross sectional view of an exemplary assembled end fitting adapter coupled to a second end of a core wire of the exemplary cable system depicted in FIGS. 2A-2C.

FIG. 8A illustrates a side cross sectional view of an exemplary assembled end fitting adapter coupled to a core wire that includes a plurality of beads.

FIG. 8B illustrates a side perspective, partial cutaway view of a portion of a cable system that includes a core wire having a plurality of beads.

FIG. 8C illustrates a side perspective, partial phantom view of a cable system that includes a core wire having a plurality of beads.

FIG. 9 illustrates a front perspective view of an exemplary one-way clamp of an end fitting adapter of a cable system.

FIGS. 10A and 10B illustrate a cross sectional view and a side perspective view, respectively, of an exemplary end fitting for a cable system.

Figure 1:
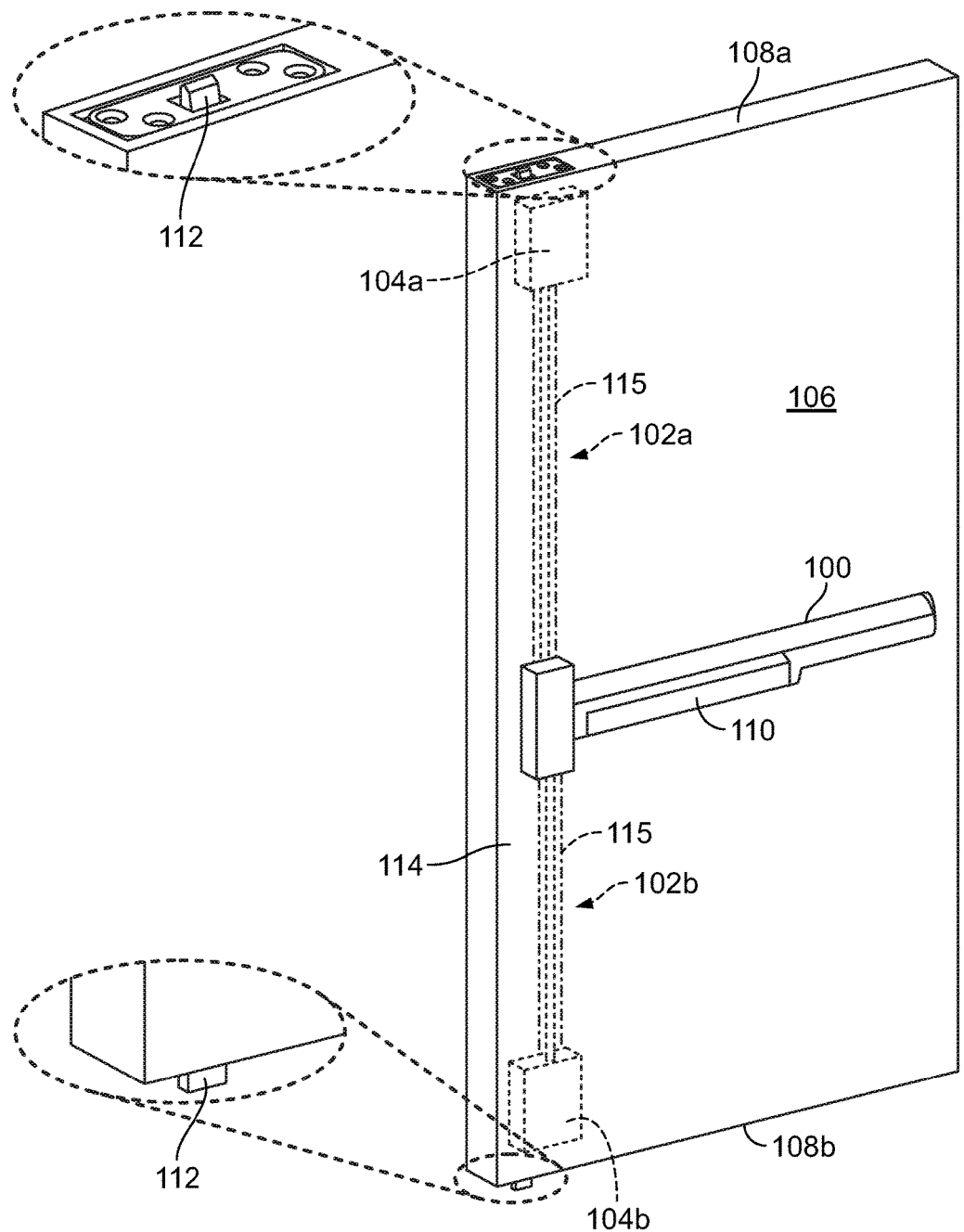
FIG. 1 illustrates a front perspective view of an exit device, cable system, and latch assemblies that are operably connected to an entryway device according to an embodiment of the present invention.

The foregoing summary, as well as the following detailed description of some embodiments of the present invention, will be better understood when read in conjunction with the appended drawings. For the purpose of illustrating the invention, there is shown in the drawings, some embodiments. It should be understood, however, that the present invention is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates a front perspective view of an exit device 100, cable system 102, and latch mechanisms or assemblies 104a, 104b that are operably connected to an entryway device 106, such as, for example, a door or gate, according to an embodiment of the present invention. The entryway device 106 may be constructed from a variety of different materials, including, for example, metal, wood, and composites, among other materials. The entryway device 106 includes at least two opposite edges, such as, for example, a top edge 108a and a bottom edge 108b. According to some embodiments, the exit device 100 may include a push bar 110 that is coupled to the top and bottom latch assemblies 104a, 104b by one or more cable systems 102a, 102b. In the illustrated embodiment, the top latch assembly 104a is connected to a first cable system 102a, and includes a latch bolt 112 that is configured to be displaced between an extended, locked position and a retracted, unlocked position. Similarly, when the bottom latch assembly 104b is connected to a second cable system 102b, and also includes a latch bolt 112 that is configured to be displaced between an extended, locked and a retracted, unlocked position. When in the extended, locked position, the latch bolts 112 of the top and bottom latch assemblies 104a, 104b may extend into mating recesses in an adjacent structure, such as, for example, an adjacent recess in a door frame, wall, and/or floor, among other structures, so as to at least assist in locking or otherwise retaining the entryway device 106 in a closed position. Various different types of latch assemblies 104a, 104b can be employed for the top and/or bottom latch assemblies 104a, 104b. Additionally, the top and bottom latch assemblies 104a, 104b can be the same type of latch assembly, or may be different types of latch assemblies.

According to some embodiments, when the entryway device 106 is to be displaced from the closed position to an open position, the push bar 110 can be displaced, such as, for example, by linearly depressing the push bar by a user, which may in turn be translated into axial displacement of at least a portion of the cable systems 102a, 102b in a manner that may exert a pulling force on the latch assemblies 104a, 104b. Moreover, such axial displacement of at least a portion of the cable systems 102a, 102b, such as, for example, axial displacement of at least a core wire of the cable systems 102a, 102b, can be translated to an axial pulling force being exerting on the latches 112 and/or latch assemblies 104a, 104b that is used to displace the latch bolts 112 from extended, locked positions to retracted, unlocked positions.

At least a portion of the exit device 100, cable system(s) 102a, 102b, and latch assemblies 104a, 104b may be positioned and/or concealed within an interior region 114 of the entryway device 106, such as, for example, in one or more cavities or channels located in the entryway device 106. For example, referencing FIG. 1, according to some embodiments, at least a portion of each cable system 102a, 102b may extend along a channel, cavity, or void 115, among or other areas, within the interior region 114 of the entryway device 106.

For purposes of clarity, FIGS. 2A and 2B depict side views of opposite portions of an exemplary cable system 102 according to an illustrated embodiment of the present invention. As illustrated, the exemplary cable system 102 includes a conduit system 103 which can comprise a plurality of conduits 116, 118. For example, the conduit system 103 depicted in FIGS. 2A-2C can include a first, outer conduit 116, and a second, inner conduit 118. However, according to other embodiments, the conduit system can include more than two conduits 116, 118. The cable system 102 may also include a core wire 120, a conduit locking device 122, and an end fitting adapter 124. As shown by at least FIG. 3, the outer conduit 116 includes a first wall 126 having an outer surface 128 and an inner surface 130, and extends from a first end 132 to a second end 134 of the outer conduit 116. Further, the inner surface 130 of the first wall 126 generally defines an outer aperture 136 of the outer conduit 116 that is sized for a telescoping or coaxial sliding relationship with at least a portion of the inner conduit 118 along at least a portion of the outer conduit 116. Further, according to some embodiments, the outer aperture 136 may extend along a central axis 138 that is arranged generally parallel with, if not co-axial with, a first central longitudinal axis 140 of the outer conduit 116.

The first wall 126 of the outer conduit 116, and more particularly, the outer and inner surfaces 128, 130 of the first wall 126, may have a variety of shapes and configurations, including, for example, having a cross sectional shape that is round, non-round, oval, square, rectangular, triangle, or trapezoidal, among other suitable shapes. Additionally, the shape of the outer surface 128 may be similar to the shape of the inner surface 130, or can be similar in shape in only some areas. Further, the outer conduit 116 may be constructed from a variety of materials, including, for example, materials that may accommodate a restriction of a size of at least a portion of the outer aperture 136 when at least a corresponding portion of the first wall 126 is subjected to a clamping or radial compressive force by one or more fittings, and/or a material that can accommodate an expansion of the outer aperture 136 to accommodate the placement of one or more press fittings in the outer aperture 136.

Similar to the outer conduit 116, the inner conduit 118 includes a second wall 142 having an inner side 144 and an outer side 146, and which extends from a first end 148 to a second end 150 along a second central axis 152. Additionally, the outer side 146 of the second wall 142 of the inner conduit 118 can be configured to be received in the outer aperture 136 of the outer conduit 116 such that an axial position of the inner conduit 118 is adjustable relative to at least an axial position of the outer conduit 116. Thus, according to some embodiments, at least a portion of the outer side 146 of the second wall 142 of the inner conduit 118 has a cross sectional size and/or that mates with the cross section size and/or shape of at least a portion of the outer aperture 136 of the outer conduit 116. Additionally, the inner side 144 of the second wall 142 of the inner conduit 118 generally defines an inner aperture 154 of the inner conduit 118 that is sized to receive slideable displacement of at least a portion of the core wire 120. Further, when inserted into the outer aperture 136, the second central axis 152 of the inner conduit 118 may generally align with at least the central axis 138 of the outer aperture 136.

A variety of different types of cables, wires, cords, strands, chain, lines, or ropes, among other devices or materials, having a length along a longitudinal axis 156 of the core wire 120 that is substantially longer than a corresponding width in a direction that is generally perpendicular to the longitudinal axis 156, may be utilized for the core wire 120. Further, the core wire 120 may be constructed from a variety of different materials, including, but not limited to, a braided or non-braided steel, metal, and non-metallic cable(s) or wire(s). Further, according to some embodiments, the core wire 120 may be coated, at least along an outer surface 158 of the core wire 120, with a vinyl material, among other coatings or materials. The core wire 120 may be sized to extend from a first end 160 to a second end 162 (FIGS. 7 and 8A) along the longitudinal axis 158 of the core wire 120. Additionally, at least a portion of the core wire 120 has a width that can accommodate placement of the core wire 120 in at least a portion of the inner aperture 154 of the inner conduit 118.

The conduit locking device 122 is adapted to selectively lock the relative positions of the outer and inner conduits 116, 118. For example, once the relative axial positions of the outer and inner conduits 116, 118 are selected, the conduit locking device 122 is adapted to provide one or more forces that at least attempt to prevent subsequent axial displacement of the inner conduit 118 relative to the outer conduit 116, or vice versa. A variety of different types of fittings may be employed for the conduit locking device 122, including, for example, fittings that may provide a clamping force for one or both of the outer and inner conduits 116, 118.

The exemplary conduit locking device 122 depicted in FIG. 4 includes mating first and second locking segments 164, 166, with both the first and second locking segments 164, 166 having inner walls 168a, 168b that generally define orifices 170a, 170b that extend through the first and second locking segments 164, 166 and which are sized to at least accommodate passage of at least the inner conduit 118 through the conduit locking device 122. The exemplary first locking segment 164 depicted in FIG. 4 includes opposite first and second extensions 172a, 172b that are separated from one another by a shoulder section 174. According to the depicted embodiment, the first extension 172a is sized relative to the outer aperture 136 of the outer conduit 116, or vice versa, such that at least a portion of the first extension 172a may be retained in the outer aperture 136 via a press, interference, and/or friction fit between the first extension 172a and the adjacent first wall 126 of the outer conduit 116. According to the illustrated embodiment, an outer portion 176 of the first extension 172a may include one or more barbs 178 that can be structured to facilitate placement of the first extension 172a into the outer aperture 136, as well as assist in the formation of the press, interference, and/or friction fit and/or otherwise assist in the retention of the engagement between the first extension 172a and the inner surface 130 of the first wall 126 of the outer conduit 116.

A first side 180a of the shoulder section 174 of the exemplary first locking segment 164 depicted in FIG. 4 is sized to abut against, or be in relative close proximity to, at least the first end 132 of the outer conduit 116 such that at least a portion of the shoulder section 174 may enter into the outer aperture 136. For example, according to the depicted embodiment, at least a portion of the shoulder section 174 may have a size, such as, for example, a diameter, that is larger than a corresponding size of the outer aperture 136, and in at least some embodiments is larger than a corresponding size of at least the adjacent portion of the outer surface 128 of the first wall 126 of the outer conduit 116. Further, an opposite second side 180b of the shoulder section 174 can provide a surface against which the second locking segment 166 of the conduit locking device 122 can abut, at least in some situations, when the second locking segment 166 is operably coupled to the first locking segment 164. For example, according to the depicted embodiment, the second side 180b may have a tapered or chamfered orientation that can mate with or provide clearance for an adjacent tapered or chamfered surface 182 of the second locking segment 166.

The second extension 172b of the first locking segment 164 is structured for mating and/or locking engagement with the second locking segment 166 of the conduit locking device 122. For example, according to some embodiments, the second extension 172b may have an internal or external thread that is adapted for a mating threading engagement with an external or internal thread of the second locking segment 166 of the conduit locking device 122. For example, according to the embodiment depicted in FIG. 4, the second extension 172b includes an external thread that mates with an internal thread in the orifice 170b of the second locking segment 166 of the conduit locking device 122.

The second extension 172b of the first locking segment 164 may further include a first compression segment 184 that is sized for a compressive engagement with a mating second compression segment 186 of the second locking segment 166 of the conduit locking device 122. For example, according to the depicted embodiment, the first compression segment 184 and second compression segment 186 may have mating conical, angled, chamfered, or tapered configurations. According to such configurations, which can include a collet configuration, the second compression segment 186 can engage the first compression segment 184 in a manner that facilitates the formation of a radial force that generally inwardly displaces, deflects, deforms, and/or otherwise bends the first compression segment 184 against a portion of the inner conduit 118 in a manner that generally secures the inner conduit 118 to at least the first locking segment 164 of the conduit locking device 122. Moreover, in the depicted embodiment, as the relative axial positions of the first and second locking segments 164, 166 are adjusted by the threaded engagement between the external thread of the second extension 172b of the first locking segment 164 and the internal thread of the second locking segment 166 such that the second locking segment 166 is moved into closer proximity to the shoulder section 174, the size of the space, such as diameter, between the portions of the second compression segment 186 that is engaging the first compression segment 184 may decrease, thereby exerting a radial force on the first compression segment 184 that is translated to a compression or clamping force on the inner conduit 118. Accordingly, when the relative axial positions of the outer and inner conduits 116, 118 are selected, such as, for example, by the selection of the axial distance or length that the inner conduit 118 is to extend out of the outer conduit 116, the compression or clamping force exerted by at least the first locking segment 164 of the conduit locking device 122 on the inner conduit 118, as well as the press, interference, or friction fit of the first locking segment 164 of the conduit locking device 122 to the outer conduit 116, may generally lock or restrain the relative axial positions of the outer and inner conduits 116, 118.

The conduit locking device 122 can have a variety of other configurations in addition to the embodiment of the conduit locking device 122 depicted in FIG. 4. For example, FIGS. 5A and 5B illustrate a conduit locking device 400 that provides a frictional clamp for securing the relative location of the outer and inner conduits 116, 118. According to the illustrated embodiment, the conduit locking device 400 includes a first locking segment 402, a second locking segment 404, and a clamping body 406.

The first locking segment 402 includes a sidewall 408 that has an inner surface 410 and an outer surface 412. The inner surface 410 defines a passageway 414 in the first locking segment 402, and can include a first portion 416 and a second portion 418. The first portion 416 of the inner surface 410 is sized, such as, for example, with a diameter, so that at least the portion of the passageway 414 adjacent to the first portion 416 is configured to receive insertion of at least a portion of the outer conduit 116, such as, for example, an end portion of the outer conduit 116. Further, according to some embodiments, the sidewall 408 can be configured such that a force can be applied sidewall 408 that is used to clamp or otherwise crimp a portion of the first portion 416 of the inner surface 410 to a portion of the outer conduit 116 that is positioned within the passageway 414 of the first locking segment 402.

The second portion 418 of the inner surface 410 of the first locking segment 402 generally defines a passageway 414 that has a size, such as, for example, a diameter, that can accommodate passage of the inner conduit 118, but not the outer conduit 116, through at least the portion of the passageway 414 adjacent to the second portion 418 of the first locking segment 402. Further, as discussed below, according to the illustrated embodiment, the second portion 418 includes a first tapered region 420 that is configured to engage and exert a generally inward force against the clamping body 406.

Similar to the first locking segment 402, the second locking segment 404 includes a sidewall 422 that has an inner surface 424 and an outer surface 426. The inner surface 424 generally defines a passageway 428 of the second locking segment 402 that is sized to accommodate at least passage of a conduit, such as, for example, the inner conduit 118, through the second locking segment 404. According to some embodiments, the inner surface 424 of the second locking segment 404 can include a first portion 430 that generally defines a size of the passageway 428, such as, for example, a diameter, that is similar to that of the inner conduit 118, while the second portion 432 generally defines a size of the passageway 428 that can receive at least a portion of the clamping body 406. The second portion 432 of the inner surface 424 can generally extend to a shoulder 434 which, according to the illustrated embodiment, can be positioned between the first and second portions 430, 432 of the inner surface 424.

The clamping body 406 can have a sidewall 436 that generally defines an inner passage 438 of the clamping body 406. The inner passage 438 can be sized to receive insertion of at least the inner conduit 118. According to the illustrated embodiment, at least a portion of the outer surface 440 of the sidewall 436 can correspond to a similar size, such as diameter, of the passageway 428 in the region of the second portion 432 of the inner surface 424 of the second locking segment 404. Moreover, the clamping body 406 can be sized to be positioned at least in the portion of the passageway 428 that is generally defined by the second portion 432 of the inner surface 424 of the second locking segment 404.

The outer surface of the clamping body 406 can also include a second tapered region 442 that is configured to matingly engage the first tapered region 420 of second portion 418 of the first locking segment 402. Accordingly, when the clamping body 406 and at least a portion of the first tapered region 420 of the first locking segment 402 are positioned in the passageway 428 of the second locking segment 404 in the region of the second portion 432 of the inner surface 424, the first tapered region 420 of the first locking segment 402 can be brought into pressing engagement with the second tapered region 442. Additionally, linear movement of the clamping body 406 in a direction away from the first tapered region 420 can be limited or prevented by the shoulder 434. As the first locking segment 402 continues to be at least linearly displaced relative to at least the clamping body 406 so that at first tapered region 420 is at least linearly displaced relative to the second tapered region 442, a resulting pressing engagement between the first tapered region 420 and the second tapered region 442 can result in at least a portion of the clamping body 406 being bent, deformed, and/or displaced so as to decrease a size, such as diameter, of the inner passage 438 of the clamping body 406. Moreover, such a pressing engagement between the first tapered region 420 and the second tapered region 442 can result in the clamping body 406 being clamped or locked onto at least a portion of the inner conduit 118 in the inner passage 438, which can at least assist in preventing relative movement between the outer and inner conduits 116, 118.

Further, such pressing engagement between the first tapered region 420 and the second tapered region 442 can also facilitate a pressing engagement between the outer surface 412 of the sidewall 408 of the first locking segment 402 and the inner surface 424 of the sidewall 422 of the second locking segment 404 that secures the relative positions of the first and second locking segments 402, 404, as well as secures the relative positions of the outer and inner conduits 116, 118. Optionally, according to some embodiments, the first and second locking segments 402, 404 can be threadingly engaged such that, as the first or second locking segment 402, 404 is rotatably displaced relative to the other of the first and second locking segments 402, 404, at least the first tapered region 420 is at least linearly displaced relative to the second tapered region 442 in a manner that facilitates the clamping or locking of the clamping body 406 to the inner conduit 118, which can in turn at least assist in preventing relative movement between the outer and inner conduits 116, 118.

Additionally, FIG. 6 illustrates an example of a conduit locking device 122' in the form of one or more clamps 188. More specifically, according to some embodiments, the clamp 188 can include first and second clamp portions 189a, 189b, such as, for example, a pair of spring or hose clamps. The first clamp portion 189a can be configured to be positioned about the first wall 126 of the outer conduit 116 such that the first clamp portion 189a can provide a compressive force against the first wall 126, which can be, in at least some embodiments, translated to a force against at least an adjacent portion of the second wall 142 that is positioned at least within the outer aperture 136. The second clamp portion 189b of the spring clamp 189b can be positioned about, and sized to exert a compressive force against, the second wall 142 of the inner conduit 118. Further, the compressive forces exerted by the first and second clamp portions 189a, 189b against at least the outer and inner conduits 116, 118, respectively, may be sufficient to at least resist axial displacement of the first and second clamp portions 189a, 189b along the associated first and second walls 126, 142. Further, the axial position of the first clamp portion 189a relative to the second clamp portion 189b may be relatively fixed by an arm 191 that axially extends between, and couples together, the first and second clamp portions 189a, 189b.

According to some embodiments, each of the first and second clamp portions 189a, 189b may include at least one outer protrusion and at least one inner protrusion. When the position of the clamp 188 relative to the outer and inner conduits 116, 118 is to be adjusted, a force may be exerted to bring one or more of the outer protrusions 190a into closer relative proximity to one or more of the adjacent inner protrusions 190b, thereby at least temporarily increasing a size of the associated first or second clamp portion 189a, 189b, such as, for example, a size of an inner aperture 193a, 193b of the associated first or second clamp portion 189a, 189b. According to such an embodiment, the size of the first and second clamp portions 189a, 189b may be increased such that the clamp 188 may be axially displaced along the cable system 102 to a position in which the force on the spring clamp 188 may be released or reduced such that the first and second clamp portions 189a, 189b can exert compressive forces on at least the adjacent outer and inner conduits 116, 118 to secure the relative positions of the outer and inner conduits 116, 118. Alternatively, according to other embodiments, the first and second clamp portions 189a, 189b may include a worm drive that engages teeth or recesses along an outer surface 195a, 195b of the first and second clamp portions 189a, 189b, respectively, such that rotational displacement of the worm drive in one direction can reduce the size of the associated aperture 193a, 193b, while rotation in an opposite direction can increase the size of the associated aperture 193a, 193b. While the exemplary embodiments shown in FIGS. 5A-6 illustrates a particular types of conduit locking devices, a variety of other devices may be employed, including, but not limited to, a quick release clamp, a compression fitting, or a quick release stem clamp, among other suitable clamps.

Referencing FIGS. 2A-2C and 7, according to some embodiments, the second end 134 of the outer conduit 116, and the opposite first end 148 of the inner conduit 118 may each be coupled to a conduit adapter 190 that is structured to secure an axial position of at least a portion of the cable system 102. For example, according to some embodiments, the conduit adapters 190 may be configured as latch adapters that secure one of the first end 132 of the outer conduit 116 and the second end 150 of the inner conduit 118 to, or in relatively close proximity to, a latch assembly 104a, 104b or an associated or nearby bracket or housing, and the other of the first end 132 of the outer conduit 116 and the second end 150 of the inner conduit 118 to an exit device 100 or associated or nearby bracket or housing. Additionally, the conduit adapter 190 can include an adapter orifice 192 sized to accommodate passage of the core wire 120 through the conduit adapter 190.

Referencing FIG. 7, according to some embodiments, the conduit adapter 190 may have opposite first and second sections 194a, 194b, the first section 194a being structure to be securely coupled to the first end 132 of the outer conduit 116 and/or the second end 150 of the inner conduit 118, such as, for example, by a mechanical connection, including a pin, screw, or bolt, by a compressive force, such as, for example, by a clamp, and/or by a press, interference, or friction fit. For example, according to the embodiment depicted in FIG. 7, the first section 194a may be sized for a press, interference, or friction fit in the outer aperture 136 of the outer conduit 116 and/or the inner aperture 154 of the inner conduit 118. Further, similar to the above-discussed first extension 172a, the first section 194a can include one or more barbs 196, which can be structured to facilitate the placement of the first section 194a into the outer aperture 136 and/or inner aperture 154, assist in the formation of the press, interference, and/or friction fit, and/or assist in the retention of the engagement between the conduit adapter 190 and the first and second wall 126, 142 of the associated outer or inner conduit 116, 118.

The conduit shoulder section 198 of the conduit adapter 190 is sized to at least abut against at least the adjacent end 132, 150 of the corresponding outer or inner conduit 116, 118 such that at least a portion of the conduit shoulder section 198 does not, or cannot, enter into the associated outer or inner aperture 136, 154. For example, according to the depicted embodiment, at least a portion of the conduit shoulder section 198 may have a size, such as, for example, a diameter, that is larger than a corresponding size of the outer aperture 136, and, in at least some embodiments, is larger than a corresponding size of at least the adjacent outer or inner aperture 136, 154. Further, an opposite side of the conduit shoulder section 198 can assist in retaining an axial position of the cable system 102 when the cable system 102 is operably connected to an entryway device 106, exit device 100, latch assembly 104a, 104b, and/or associated housings, walls, and/or brackets. For example, according to some embodiments, a portion of the second section 194b of the conduit adapter 190 may include an engagement area 200 that is configured, such as, for example, to be received in an groove, slot, or other opening in a portion of a latch assembly 104a, 104b or exit device 100, and which is not sized to receive the conduit shoulder section 198 or a section protrusion 202 on an opposite side of the engagement area 200. For example, according to some embodiments, the conduit shoulder section 198 and section protrusion 202 may generally have sizes, such as diameters, among other shapes and sizes, that prevent the conduit shoulder section 198 and section protrusion 202 from entering into the groove, slot, or other opening in a portion of a latch assembly 104a, 104b, exit device 100, or associated bracket or housing that is sized to receive the engagement area 200 of the second section 194b. Further, according to some embodiments, the engagement area 200 may be a recessed or smaller sized portion of the second section 194b, with the section protrusion 202 being generally created by a difference in the size and/or shape between the engagement area 200 and an adjacent portion of the second section 194b.

At least a portion of the core wire 120 may extend beyond the conduit aperture 102 in the conduit adapter 190 such that the core wire 120 may be selectively trimmed to accommodate further adjustment to the axial length of the cable system 102. Moreover, a portion of the core wire 120 may extend from the conduit adapter in an axial direction away from the outer an/or inner conduit 116, 118 such that the axial length of the core wire 120 may be adjusted to accommodate the size of a particular of the entryway device and/or distance between the exit device 100 and associated latch assembly(ies) 104a, 104b in which the cable system 102 may be employed. Optionally, according to some embodiments, when the axial length of the core wire 120 is determined, such as, for example, determined during installation of the cable system 102 in or about an entryway device 106, excess portion or length of the core wire 120 may be removed or trimmed, such as, for example, by cutting of the core wire 120. The length of core wire 120 that is to be cut from the core wire 120 may be determined during installation of the cable system 102 in a number of manners, including, for example, through the use of a guide or spacer that may indicate the length of core wire 120 that is to extend beyond a reference location, including, but not limited to, from an end 132, 134, 148, 150 of one or both of the outer and/or inner conduits 116, 118, or from an adjacent conduit adapter 190, among other reference positions.

Referencing FIG. 7, one or more opposite ends 160, 162 of the core wire 120 may be secured to an end fitting adapter 124 that may be structured to couple the core wire 120 to a latch bolt 112, latch assembly 104a, 104b, and/or exit device 100. For example, according to the illustrated embodiment, both ends 160, 162 of the core wire 120 are coupled to an end fitting adapter 124. The end fitting adapters 124 can be adapted to be secured to the core wire 120 in a number of different configurations. For example, FIG. 7 illustrates a collet style end fitting adapter 124 including a first fitting portion 204 and a second, mating fitting portion 206. The first fitting portion 204 includes a cavity 208 that is generally defined by an inner wall 210 and which is sized to receive placement of at least an end 160, 162 of the core wire 120. A first compression wall 212 positioned about an outer portion of the fitting portion 204 and extending over at least a portion of the inner wall 210 can be configured for engagement with a mating second compression wall 214 in an aperture 216 of the second fitting portion 206. Such engagement between the first and second compression walls 212, 214 may be configured to facilitate formation of a radial compressive force that generally inwardly displaces, deflects, deforms, and/or otherwise bends at least a portion of the first fitting portion 204 toward the core wire 120 in the cavity 208 in a manner that exerts a compressive force against the core wire 120, and which secures at least the first end fitting adapter 124 to the core wire 120. Moreover, according to the embodiment depicted in FIG. 7, the first and second fitting portions 204, 206 may be arranged to provide compressive forces on the core wire 120 via a collet type engagement between the first and second compression walls 212, 214. According to such an embodiment, the first and second compression walls 212, 214 may have conical, tapered, angled, or chamfered configurations that may at least assist in facilitating formation of a compressive force on at least a portion of the core wire 120 that is positioned in the cavity 208 of the first fitting portion 204. Further, according to some embodiments, the end fitting adapter 124 may be configured to retain a locking engagement with the core wire 120 of up to around 100 pounds-force (lbf).

Attaining compressive engagement between the first and second compression walls 212, 214 of the exemplary end fitting adapter 124 depicted in FIG. 7 may be further facilitated by a mating threaded engagement between the first and second fitting portions 204, 206. For example, according to some embodiments, the first fitting portion 204 may include an external thread that engages an internal thread of the second fitting portion 206. According to such an embodiment, at least as one of the first and second fitting portions 204, 206 is rotated relative to the other of the first and second fitting portions 204, 206, and the relative axial position of the first and second fitting portions 204, 206 may be adjusted in a manner that facilitates engagement of the first and second compression walls 212, 214. The threaded engagement between the first and second fitting portions 204, 206 may continue to be utilized to adjust the relative axial positions of at least the first and second compression walls 212, 214 so as to increase the compressive force that is translated to at least a portion of the core wire 120 positioned in the cavity 208, and thereby securely retaining engagement of the end fitting adapter 124 to the core wire 120.

According to some embodiments, the end fitting adapter 124 can also include a connector 218 that is sized and shaped to engage a mating lug or connector of the exit device 100, the latch assembly 104a, 104b, or the latch bolt 112. For example, according to some embodiments, the connector 218' is configured as a T-shaped or spherical shaped connector, among other suitable connector configurations. Additionally, according to some embodiments, the connector 218 may be directly coupled to or extend from the core wire 120, such as, for example, being clamped or welded to the wire cable 120, among other types of connections or fasteners. Further, according to some embodiments, the end fitting is a collet style end fitting adapter 124 that includes a collet insert which translates compressive forces to the core wire 120 so as to securely retain or lock the core wire 120 in engagement with the end fitting adapter 124. According to such an embodiment, the first fitting portion 204 includes a compression wall that engages a compression wall of the collet insert in a manner that can reduce the size of a cavity of the collet insert in which a portion of the core wire 120 is positioned, and thereby compressing the core wire 120 against an inner surface of the collet insert. Additionally, the collet insert may include features that facilitate a gripping force which may assist in retaining the core wire in a locking or otherwise relatively secure engagement with at least the collet insert. For example, according to some embodiments, portions of the inner surface of the collet insert may be separated, such as being raised or lowered, from other portions of the inner surface to provide teeth or gripping areas of the inner surface of the collet insert that may assist in retaining engagement of at least the collet insert to the core wire 120. Further, similar to the end fitting adapter 124 depicted in FIG. 7, according to such an embodiment, operable engagement between the collet insert and the first fitting portion may be facilitated by adjustment of the axial position of the associated first fitting segment relative to the collet insert and the second fitting segment via a threaded engagement between an external thread of the first fitting portion and an internal thread of the second fitting segment.

FIGS. 8A-8C illustrate a cable system in which the core wire 120' includes a plurality of beads 234 spaced apart from adjacent beads 234 and which extend outwardly along at least a portion of an axial length of the core wire 120'. The beads 234 may be adapted to engage the end fitting adapters 124' on either end of the cable system in a manner that may at least assist in retaining the end fitting adapter 124' in relatively locking engagement with the core wire 120' and/or assist in translating an axial pulling force from the core wire 120' to the end fitting adapter 124'. According to some embodiments, the first fitting portion 204' of the end fitting adapter 124' includes a pocket 236 in communication with the cavity 208' of the first fitting portion 204', and which is sized to receive placement of a bead 234. Additionally, according to some embodiments, the pocket 236 may extend through an outer wall 238 of the first fitting portion 204'. Accordingly, excess core wire 120' that can be trimmed, as previously discussed, can be trimmed such that a bead 234 may be positioned within the pocket 236. Further, the pocket may generally terminate at an end wall 240 positioned between the bead 234 that is received in the pocket 236 and an opening 240 of the cavity 208', and which is sized to abut against the bead 234 at least when the core wire 120' exerts a pulling force on at least the first fitting portion 204'.

While FIGS. 7-8C are discussed above in terms of a threaded collet style end fitting adapters 124, 124', it should be understood that a variety of other mechanisms may be used to lockingly couple an end fitting adapter to the core wire 120. For example, FIG. 9 illustrates a clamp 244 which can include, but is not limited to, a one-way clamp, which may be lockingly secured to the core wire 120 as well as coupled, directly or indirectly, to the connector 218. According to such an embodiment, the clamp 244 can include a body portion 246 having a passageway 248 sized to receive passage of at least a portion of the core wire 120. The clamp 244 can further include a finger portion 250 that is biased by a biasing element 252, such as, for example, a spring, toward a side, such as a first side 254, of the passageway 248. According to such an embodiment, with a portion of the core wire 120 extending through the passageway 248 between the first side 254 of the passageway 248 and the finger portion 250, the biasing element 252 may exert a force on the finger portion 250 that displaces the finger portion to a locked position in which the finger portion presses the adjacent portion of the core wire 120 between the finger portion 250 and the first side 254 of the passageway 248. Further, according to some embodiments, the clamp 244 may be configured as a one-way clamp 244 in which the finger portion 250 and/or biasing element 252 may be retracted away from the locked position by axial displacement of the core wire 120 in one, and only one, axial direction. According to such an embodiment, the clamp 244 may be oriented such that the core wire 120 is prevented from being pulled through the clamp 244 when the core wire 120 exerts a pulling force on the clamp 244 during at least operation of the associated latch assembly 104a, 104b.

FIGS. 10A and 10B illustrate a cross sectional view and a side perspective view, respectively, of an exemplary end fitting 500 for use with any of the embodiments and variations of the cable systems 100 discussed herein. Further, features discussed with respect to the end fitting 500 illustrated in FIGS. 10A and 10B can be used with other features of end fittings, and/or related components, that are also disclosed herein, including, for example, end fittings and/or related components depicted in at least FIGS. 2B, 2B, 4A, 7, 8A and 8B.

As illustrated in FIGS. 10A and 10B, the end fitting 500 includes mating first and second locking segments 502, 504. The first and second locking segments 502, 504 are structured for selectable mating engagement, such as, for example, by a threaded engagement therebetween, among other types of suitable secure or locking engagements. According to the illustrated embodiment, the first locking segment 502 has a sidewall 506 including an inner portion 508 and an outer portion 510, with the inner portion 508 generally defining an inner region 512 of the first locking segment 502. According to the illustrated embodiment, the sidewall 506 can have an internal or external thread that mates with a corresponding external or internal thread of the second locking segment 504. For example, according to the illustrated embodiment, the inner portion 508 of the sidewall 506 of the first locking segment 502 can include an internal thread that mates with an external thread of the second locking segment 504.

At least a portion of the inner region 512 of the first locking segment 502 can be further defined by an upper wall 514 that can extend across at least a portion of the sidewall 506 and/or the inner region 512. Further, similar to at least some of the previously discussed connectors 218, a connector 516, such as, for example, a T-shaped or spherical shaped connector, among other suitable connectors, can extend from a side of the upper wall 514 such that the connector 516 and the inner region 512 are arranged on opposite sides of the upper wall 514. As shown in FIGS. 10A and 10B, according to some embodiments, the connector 516 can include a first portion 518 and a second portion 520, with the second portion 520 separating the first portion 518 from the upper wall 514. Moreover, the second portion 520 can be sized to provide a space or clearance between the first portion 518 and the upper wall 514 to accommodate receipt of the first portion 518 in, or otherwise engaged with, a mating lug or connector 522 of the exit device 100, the latch assembly 104a, 104b, or the latch bolt 112.

According to some embodiments, at least a portion of the inner region 512 can be occupied by or comprise at least a portion of a clamping segment 524. For example, according to some embodiments, the clamping segment 524 may comprise a portion of a unitary or monolithic first locking segment 502. For example, the clamping segment 524 can be attached to and/or extend from the sidewall 506 and/or the upper wall 514 of the first locking segment 502. According to such an embodiment, the unitary nature of the first locking segment 502 can result in the clamping segment 524 being moved with the other portions of the first locking segment 502 as the first locking segment 502 is at least linearly displaced along the core wire 120. Alternatively, according to other embodiments, the clamping segment 534 is a separate component that is received in the inner region 512 of the first locking segment 502. According to such embodiments, some movements of the first locking segment 502, such as, for example, linear movement of the first locking segment 502 toward the second locking segment 504, can result in at least a portion of the first locking segment 502 that defines, and/or is positioned in, the inner region 512 engaging the clamping segment 524 in manner that results in the clamping segment 524 being moved in at least a similar linear direction along the core wire 120.

According to the illustrated embodiment, at least the upper wall 514 and a portion of the connector 516 can include an orifice 526 in communication with at least the inner region 512 of the first locking segment 502. Moreover, the first locking segment 502 can be structured such that a core wire 120 can extend into the inner region 512 through an opening of the inner region 512, pass through the orifice 526, and exit from the inner region 512 through another opening in the first locking segment 502. For example, in the illustrated embodiment, the orifice 526 extends through the clamping segment 524, the upper wall 514, and the first and second portions 518, 520 of the connector 516. Further, according to some embodiments, the orifice 526 can be generally aligned with a central longitudinal axis 528 of the first locking segment 502, the second locking segment 504, the inner region 512, the clamping segment 524, and/or the connector 516.

The second locking segment 504 includes a sidewall 530, with an inner portion 532 of the sidewall 530 generally defining an interior region 534 of the second locking segment 504. According to the illustrated embodiment, an exterior side 536 of the sidewall 530 includes a male threaded region that is configured to mate with an internal thread of the first locking segment 502. The interior region 534 can be sized to at least accommodate passage of the core wire 120 through the second locking segment 504, as well as receive placement of at least a portion of the clamping segment 524. According to the illustrated embodiment, a portion of an inner portion 532 of the sidewall 530 is inwardly tapered, as shown in FIG. 10B, thereby providing a tapered region 538. At least a portion of the tapered region 538 is sized to receive insertion of the clamping segment 524. Further, according to some embodiments, at least a portion of the outer surface 540 of the clamping segment 524 can include a tapered configuration similar to the tapered region 538 of the inner portion 532 of the second locking segment 504. According to the illustrated embodiment, as the clamping segment 524 linearly progresses into the interior region 534 of the second locking segment 504, the clamping segment 524 can engage portions of the tapered region 538 in which a size, such as diameter, of the tapered region 538 is smaller than the corresponding size of the outer surface 540 of the clamping segment 524. In such instances, an inward force can be exerted against the clamping segment 524 which can cause deformation, bending, and/or deflection of at least a portion of the clamping segment 524. Moreover, exertion of such force against the clamping segment 524 can cause a reduction in a size of an opening 542 that extends through the clamping segment 524 and which is sized to receive the core wire 120. Such restriction in the size of the opening 542 of the clamping segment 524 can cause the clamping segment 524 to exert a clamping or locking force against the core wire 120 in the opening 524, which can in turn secure the clamping segment 524, as well as the associated engaged first and second locking segments 502, 504, at a selected position along the core wire 120, as shown in FIGS. 10A and 10B.

During use, the core wire 120 can extend through the interior region 534 of the second locking segment 504, the opening 542 of the clamping segment 524, and through the orifice 526 and the inner region 512 of the first locking segment 502 so as to accommodate linear displacement of each of the components of the end fitting 500 relative to the core wire 120. Accordingly, during installation, the first and second locking segments 502, 504 can be adjustably displaced along the core wire 120 until the first and second locking segments 502, 504 are positioned at a selected position relative to the core wire 120. The selected location for positioning of the end fitting 500 relative to the core wire 120 before the relative position of the end fitting 500 is lockingly secured can be determined in a variety of manners, including, for example, by placement of a spacer between the end fitting 500 and the adjacent conduit 116, 118. With the first and second locking segments 502, 504 located at selected positions, the first and second locking segments 502, 504 can be engaged, if not already engaged, in a manner that clamps the clamping segment 524 to the core wire 120, such as, for example, via use of the threaded engagement between the first and second locking segments 502, 504, as previously discussed.

Such engagement between the first and second locking segments 502, 504 can reduce an overall length of the end fitting 500, which can in turn result in the clamping segment 524 entering and/or being further displaced into the tapered region 538 of the second locking segment 504. As the clamping segment 524 is further displaced into the tapered region 538, forces exerted against the clamping segment 524 that enable the position of the clamping segment 524, and moreover the position of the assembled end fitting 500, to be secured relative to the core wire 120. Further, according to some embodiments, the first and second locking segments 502, 504 can include features configured to engage tools, such as a hexagonal shape, that can assist in the secure engagement of the first locking segment 502 to the second locking segment 504, and moreover can assist in displacing the clamping segment 524 into a tapered region 538 of the second locking segment 504 so as to provide a secure, locking engagement of the end fitting 500 with the core wire 120. Additionally, when the end fitting 500 is eventually positioned at the selected or final position, such as, for example, when no adjustment or further adjustment is deemed necessary, excess core wire 120 extending out from the connector 516 can be cut or trimmed.

It is contemplated that, according to some embodiments, in the event that the position or angular orientation of the secured end fitting 500 relative to at least the core wire 120 is to be adjusted, the engagement between the first and second locking segments 502, 504 can be correspondingly adjusted, such as by loosening, so that the clamping segment 524 can be moved to a position relative to the tapered region 538 which decreases the force exerted at least by the clamping segment 524 on the core wire 120 to a degree that can again accommodate linear displacement of the end fitting 500 relative to the core wire 120. When the end fitting 500 is re-positioned to another linear and/or rotational position relative to the core wire 120, the engagement between the first and second locking segments 502, 504 can be adjusted, such as by tightening, so that the clamping segment 524 is positioned in the tapered region 538 at a location in which at least the clamping segment 524 exerts a force sufficient to maintain the relative position of the end fitting 500 relative to the core wire 120.

While some embodiments of the end fitting 500 are discussed above, it should be understood that the end fitting 500 can have a variety of other suitable configurations or modifications. For example, according to some embodiments, the clamping segment 524 can be part of, or received in, the second locking segment 504, while the tapered region 538 can be part of the first locking segment 502, among other possible variations.

Figure 11:
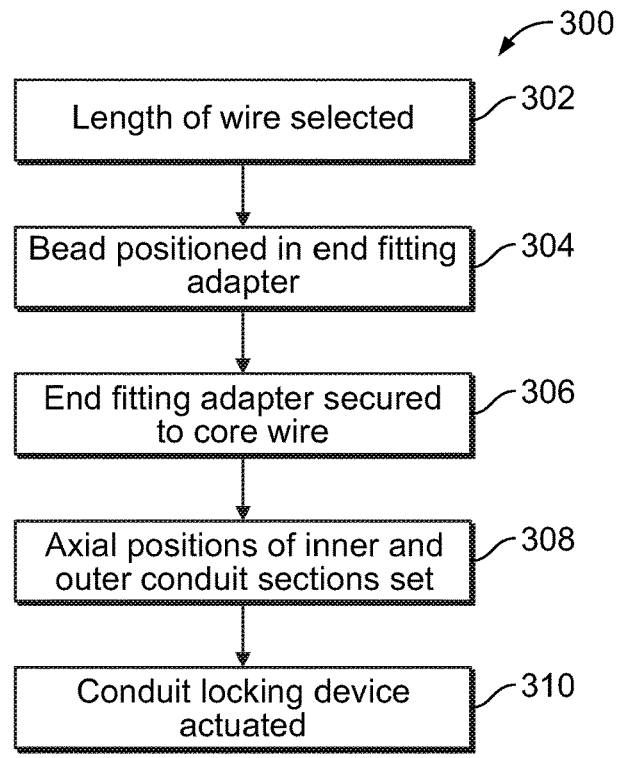
FIGS. 11 and 12 illustrate schematic flow diagrams of exemplary processes for adjusting the axial length of a cable system.

FIG. 11 illustrates a schematic flow diagram of an exemplary process 300 of adjusting an axial length of the cable system 102, 102'. The illustrated operations for all of the processes in the present application are understood to be exemplary only, and operations may be combined or divided, and added or removed, as well as re-ordered in whole or in part, unless explicitly stated to the contrary.

At step 302, a length of the core wire 120, 120' is selected. According to some embodiments, the selected core wire 120, 120' length may be based, at least in part, on the length of the portion of the core wire 120, 120' that is to extend beyond the outer and/or inner conduit 116, 118, also referred to as a core wire extension length, as indicated by $L_1$ in FIG. 2. Further, according to some embodiments, the core wire 120, 120' can be cut or otherwise trimmed to a selected axial length at a location that is in relative close proximity to a bead 234, if a bead 234 is present. At step 304, the bead 234, if any, is positioned in the pocket 236 of the end fitting adapter 124'. At step 306, the end fitting adapter(s) 124, 124' is/are lockingly secured to the core wire 120, 120', such as, for example, by tightening the threaded collet style end fitting adapters 120, 124' depicted in at least FIGS. 7-8C or the clamp 244 of FIG. 9, among other locking mechanisms. At step 308, the relative axial positions of the outer and inner conduit sections 116, 118 can be set for the selected length of the core wire 120, 120' and/or the selected core wire extension length. At step 310, the conduit locking device 122 can be actuated to prevent and/or eliminate relative motion between the outer and inner conduit sections 116, 118.

Figure 12:
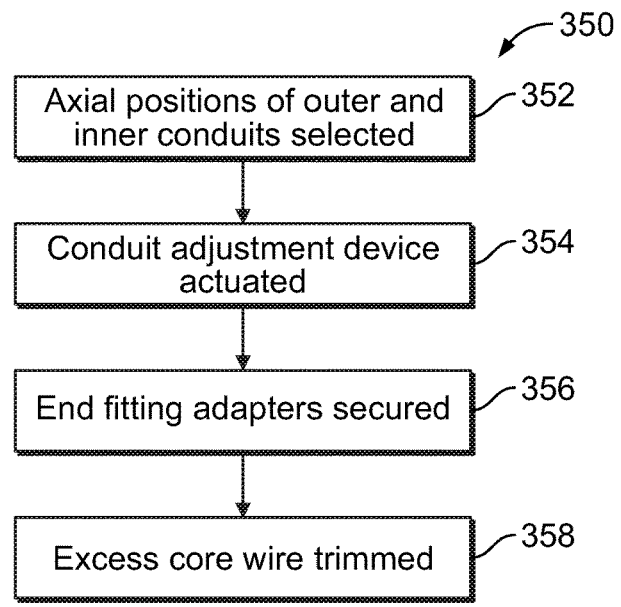

FIG. 12 also illustrates a schematic flow diagram of an exemplary process 350 of adjusting an axial length of the cable system 102, 102'. At step 352, the relative axial positions of the outer and inner conduits 116, 118 may be selected. At step 354, the conduit locking device 122 may be actuated so as to lock or otherwise generally secure the relative axial positions of the outer and inner conduits 116, 118 at selected axial positions. At step 356, end fitting adapters 120, 124' may be secured to one or both ends of the core wire 120, 120'. The second fitting portion 206, 206' of the end fitting adapter 124, 124' can be manipulated in manner that compresses the end fitting adapter 124, 124' onto the core wire 120, 120' so that the core wire 120, 120' may remain relatively securely coupled to the end fitting adapter 124, 124', such as, for example, lockingly secured to the end fitting adapter 124, 124' when the core wire 120, 120" is subjected to forces of up to around 100 pounds-force (lbf).

At step 358, the excess core wire 120, 120' may be trimmed or cut to a selected length, which can be based on a number of criteria, including, for example, the size of the entryway device 106, the distance between the exit device 100 and the latch assembly(ies) 104a, 104b, and/or the type of latch assembly 104a, 104b, among other considerations. Further, as previously discussed, the selected location for trimming the core wire 120, 120' may be attained, at least in part, through the use of a template spacer and may consider the location of a bead 234 of the core wire 120' received in an end fitting adapter 124', as previously discussed. According to some embodiments, the template spacer may be utilized to determine at least a portion, if not all, of the core wire extension length, as indicated by $L_1$ in FIG. 2.

While some embodiments are discussed herein in terms of exit devices, latches, and/or entryway devices, embodiments of the cable systems of the present application are applicable to a variety of other applications, including, but not limited to, automotive and aeronautical fields, among other fields. Moreover, the cable systems 102a, 102b, 102' discussed herein may be used in a variety of different types of applications and/or fields in which a push or pulling force is to be transmitted from one or more first devices, such as an activator device, to one or more second devices, such as, for example, an activated device, that is displaced in some manner by the force transmitted by the cable system 102a, 102b, 102'. Further, the first activation device, as well as the second activated device, both of which can be directly or indirectly coupled to the cable system, can be configured to be displaced in a variety of different manners, including, for example, linearly, rotatably, pivotally, or a combination therefor. For example, according to some embodiments, rotatable displacement of a first activation device can be used to transmit a force through the cable system that linearly displaces the second activated device, or vice versa.

FIGS. 13A-13D illustrate portions of an exemplary process for installing an exemplary cable system 600 that comprises selectively adjustable conduits 116, 118 and a core wire 120 that can include at least one selectively adjustable end fitting 608, 614. The illustrated embodiment can improve the ease with which such cable systems 600 can be installed, and can reduce the number of potential issues associated with installation of cable systems that may contribute to installation failures including, for example, failures attributed to improper sizing in the length of the core wire 120 and/or the associated conduit(s) 116, 118. Moreover, the disclosed process and associated system can eliminate at least some measurements and associated calculations relating to determining a generally correct or operable length for the core wire 120 and/or conduit(s) 116, 118. Further, while the above embodiments reference a core wire 120, embodiments disclosed herein are also applicable to other types of cables and/or rods.

According to some embodiments, installation of the cable system 600 can include providing the cable system 600 as part of a kit. The kit can include a cable system, which may be pre-assembled, and a position marker, among other potential items or components associated with the kit. Further, according to some embodiments, the kit can include hardware, including tools, that can be utilized in installing the cable system 600 and/or adjusting the lengths of components of the cable system 600, including for adjusting or securing the overall length of a conduit that can comprise telescopically arranged conduits 116, 118, the position of end fittings 608, 614 along the core wire 120, and/or the length of the core wire 120. Further, according to some embodiments, the cable system 600 may be preassembled in a manner in which the conduits 116, 118 are adjustably engaged with one another, one or more of the end fittings are selectively adjustable relative to the core wire 120, and/or the core wire 120 extends through at least a portion of the conduits 116, 118 and/or end fittings 608, 614.

According to some embodiments, the position indicator 602 can be configured to provide at least a general indication of the location of a centerline 604 for the exit device 100 which, according to some embodiments or installations, can be the location or height relative to the floor, and can be based on a code regulation and/or application. According to installations that include at least a cable system 600 that extends toward the top edge 108a of the entryway device 106, the position indicator 602 can be aligned with the centerline 604 and extend toward the top edge 108a of the entryway device 106. Additionally, according to installations that include at least a cable system 600 that extends toward the lower edge 108b of the entryway device 106, the position indicator 602 can be aligned with the lower edge 108b of the entryway device 106 and extend toward the top edge 108a of the entryway device 108a and/or toward the centerline 604.

Figure 13A:
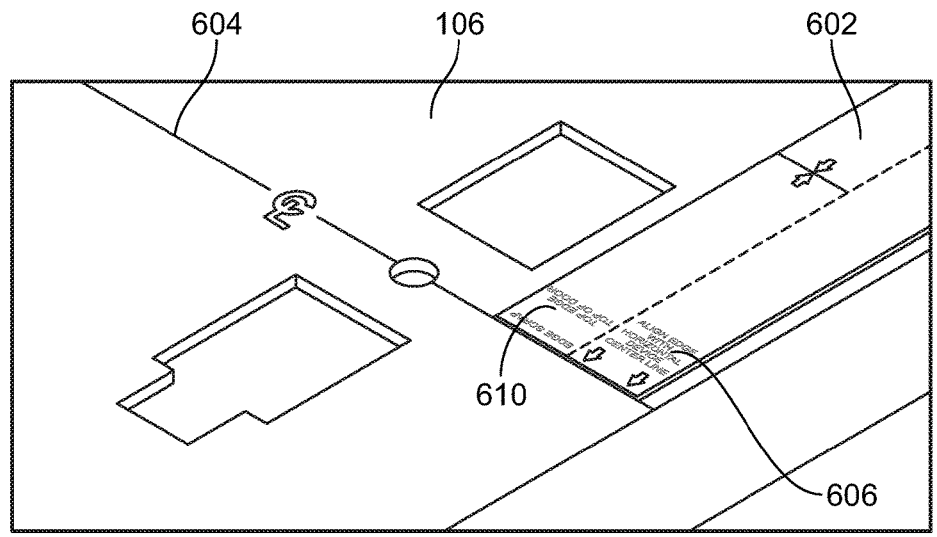
FIGS. 13A-13D illustrate perspective side views of portions of an exemplary process for installing to an entryway device an exemplary cable system that comprises adjustable cables and a selectively adjustable core wire.

According to other embodiments, the position indicator 602 can include first indicia 606, such as, for example, text, images, color, among other indicia, as well as a combination thereof, that provide an indication of the location of the centerline 604. For example, as illustrated in FIG. 13A, the position indicator 602 can extend from around at least one of the top edge 108a and the bottom edge 108b of the entryway device 106, and terminate generally at the location of the centerline 604. Further, the first indicia 606 can include text, arrows, or other indicia indicating that a location along the position indicator 602, or at an edge of the position indicator 602, corresponds to the centerline 604.

Additionally, the position indicator 602 can also include second indicia 610, such as, for example, text, images, among other indicia, as well as a combination thereof, that provides an indication of the installation location at which a second end fitting 608, an end of a conduit 116, 118, and/or a location of termination of the core wire 120, among other possible components of the cable system 600, are to be positioned, as discussed below in further detail.

The position indicator 602 can take a variety of different forms and configurations. For example, according to some embodiments, the position indicator 602 is a substrate having the first and/or second indicia 606, 610 printed, etched, or otherwise indicated at least on one side of the position indicator 602. Further, the position indicator 602 can be configured for at least temporary, selective vertical attachment to the entryway device 106. For example, according to some embodiments, an adhesive material may be positioned on, or at least exposable from, at least a portion of a side of the position indicator 602 that can abut the entryway device 106 while still providing visual access to the first and/or second indicia 606, 610. However, the position indicator 602 can also be secured to the entryway device 106 in a variety of other manners and configurations including, for example, via one or more magnets that are attached to, or separately positioned against, the position indicator 602, or providing the position indicator 602 with a static charge that at least can assist in securing the position indicator 602 to the entryway device 106. Alternatively, according to other embodiments, the position indicator 602 may be vertically held by the installer(s) or otherwise lie against, or otherwise be coupled to, the entryway device 106.

Figure 13B:
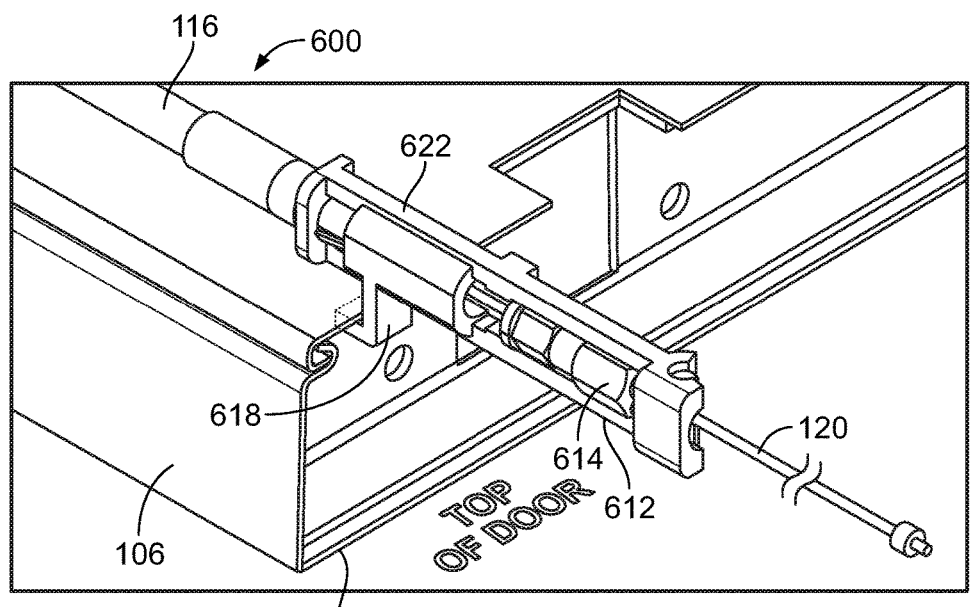

Referencing FIG. 13B, according to some embodiments, the kit or installation process can also include the use of a fitting spacer 612. The fitting spacer 612 can provide an indication of the installation location for a first end fitting 614 of the cable system 600, the first end fitting 614 being installed at an end of the core wire 120 that is positioned proximally adjacent to a top or bottom edge 108a, 108b of the entryway device 106, and/or which is located at a first end 616a of the cable system 600. According to the depicted embodiment, the first end fitting 614 can be similar to the adjustable end fitting 500 discussed above and shown in at least FIGS. 10A and 10B. However, a variety of other types or configurations of end fittings can also be used for the first end fitting 614.

In the illustrated embodiment, the fitting spacer 612 can engage the entryway device 106, such as, for example, an edge or surface about or generally around the corresponding top or bottom edge 108a, 108b of the entryway device 106, in a manner that at least temporarily secures a position of the fitting spacer 612 relative to the entryway device 106. For example, according to the embodiment depicted in FIGS. 13B and 13D, the fitting spacer 612 can include a hook 618 that extends from a body portion 622 of the fitting spacer 612, and which is sized to engage or otherwise hook onto a surface or edge of the entryway device 106.

The body portion 622 also includes an engagement section 624 sized to engage the first end fitting 614 at a position that can correspond to a position at which, when installed, the connector 620 of the adjacent end fitting 614 can operably mate, engage, or otherwise be coupled to a mating latch assembly 104a, 104b or a latch bolt 112. The body portion 622 can also include one or more cavities 626 that are sized to receive placement of other portions of the end fitting 614 and/or a conduit adapter 190 in a manner that operably separates the conduit adapter 190 from the end fitting 614, and at a distance that may at least assist in operably positioning the first end fitting 614 about the core wire 120 at a location that facilitates proper operation of the exit device 100.

Figure 13C:
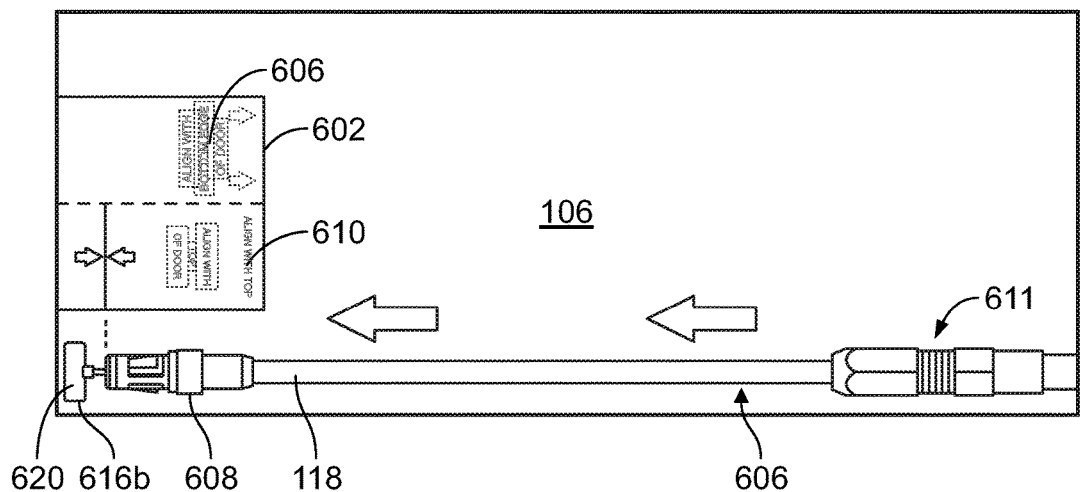
Figure 13D:
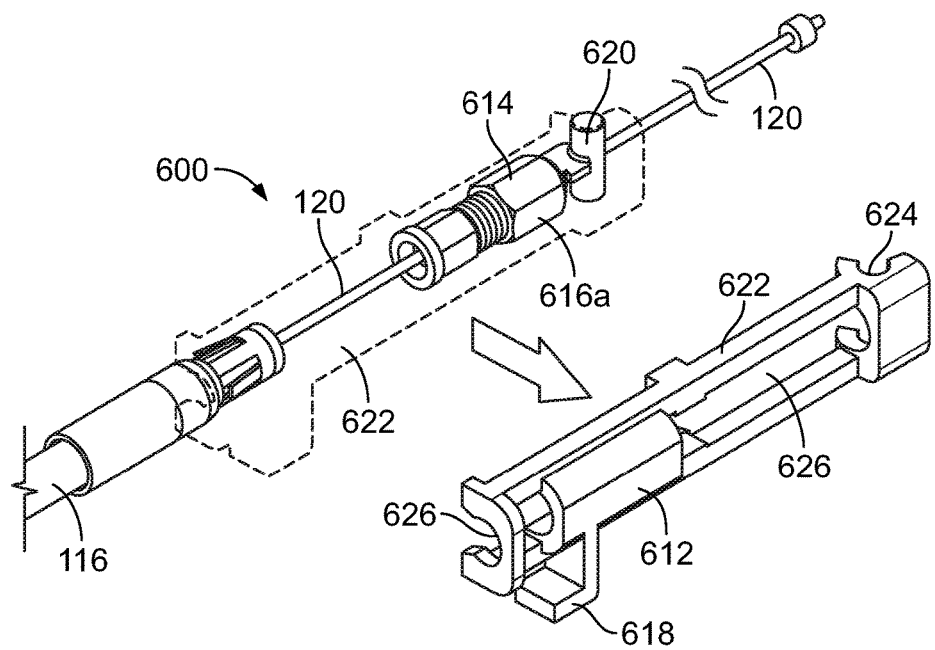

According to the illustrated embodiment, with the position indicator 602 operably positioned on the entryway device 106 at a location that generally indicates the centerline 604 of the entryway device 106, and the first end fitting 614 properly engaged with the engagement section 624 of a fitting spacer 612 that is secured to the entryway device 106, such as, for example, via the hook 618, the second indicia 610 on the position indicator 602 can be used to indicate where the second end fitting 608 or other portion of the cable system 600 that is or will be positioned proximally adjacent to the second end fitting 608 is to be positioned, as indicated, for example, in FIG. 13C. For example, referencing FIG. 13B, the second indicia 610 can be a line, color, text, or other indicia that provides an indication of where a particular surface or component of the cable system 600 is to be located, such as, for example, the location at which an wall of the conduit adapter 190 at a second end 616b of the cable system 600 and/or an end of a conduit 116, 118 is to be located. Such positioning of the cable system 600 relative to the location indicated by the second indicia 610 can, according to some embodiments, include adjusting a length of the telescoping conduits 116, 118 and/or the relative locations of at least one of the first and second end fittings 614, 608 relative to the core wire 120 and/or the conduits 116, 118. Further, such maneuvering or adjustment of the cable system 600, or components thereof, can include pulling the cable system 600 relatively taut so as to attain relatively accurate positioning of the components.

According to the illustrated embodiment, the second end fitting 608 can correspond, for example, to the end fitting depicted in FIGS. 2A, 2C and 7, among other end fittings. Alternatively, according to some embodiments, the second end fitting 608 can correspond to the end fitting 500, as depicted and discussed in connection with FIGS. 10A and 10B. Alternatively, the first end fitting 614 can have similar or different configuration as the second end fitting 608.

With the first end fitting 614 of the cable system 600 operably secured in the fitting spacer 612 that extends from the top or bottom edge 108a, 108b of the entryway device 106 and the second end 616b of the cable system 600, such as, for example, the conduit adapter 190, at a second end 616b of the cable system 600, generally positioned or aligned at a location indicated by the second indicia 610 of the position indicator 602, the relative positions of the conduits 116, 118 can be secured via operation of a conduit locking device 611, such as, for example, the previously discussed conduit locking devices 122, 122', 400 illustrated in FIGS. 4-6. With respect to at least the conduit locking devices 122, 122', 400 depicted in FIGS. 4, 5A and 5B, the operation can at least initially involve hand tightening of the conduit locking device 611 before final tightening is performed through the use of a tool, such as, for example, a wrench or pliers, among other tools, which may be included with the kit.

With at least the relative positions of the conduits 116, 118 secured, such installation can further include exerting a pulling force against the core wire 120 so as to remove excess core wire 120 between at least the first and second end fittings 614, 608, including between the connector 620 of the end fitting 614 and the second end fitting 608, among other locations at which excess core wire 120 may be present. Further, such removal of slack or excess core wire 120 may at least attempt to allow for adjustment, if necessary, in the linear position of at least one of the first and second end fittings 614, 608, among other components of the cable system 600. According to embodiments in which the first or second end fitting 614, 608 has a configuration similar to the end fitting 500 previously discussed in relation to FIGS. 10A and 10B, such tightening of the core wire 120 can include pulling excess core wire 120 at least through the orifice 526 in the connector 620 of the corresponding end fitting 614, 608, and subsequently at least hand tightening the end fitting 614, 608 so as to at least secure the position of the end fitting 614, 608 relative to the core wire 120. The fitting spacer 612 can subsequently be removed, and the end fitting 614, 608 can be further tightened to the core wire 120 via use of a tool, such as, for example, a wrench that may or may not be part of the kit. Further, excess core wire 120 that extends away from the cable system 600, if any, such as, for example, the core wire 120 extending from the orifice 526 of an end fitting 608, 614 that has a configuration similar to the end fitting 500 discussed above in connection with FIGS. 5A and 5B, can be cut away from the other core wire 120. Such cutting of excess core wire 120 may also occur at a location along the core wire 120 such that the resulting remaining end of the core wire 120 is generally flush with the adjacent end fitting 614, 608.

The above-discussed process is discussed in terms of a cable system 600 that extends between the centerline 604 to a latch bolt 112 or latch assembly 104a, 104b at one of the top and bottom edge 108a, 108b of the entryway device 106. The process can also be repeated for another cable system 600 that extends between the centerline 604 and a latch bolt 112 or a latch assembly 104a, 104b at the other of the top and bottom edge 108a, 108b of the entryway device 106. Further, removal of the cable system 600, or further adjustments as to the relative positions of the conduits 116, 118 or location of at least one of the first and second end fittings 614, 608 along the core wire 120, can generally be attained by loosening the associated conduit locking device 611 and/or end fitting 614, 608 in manners similar to those previously discussed.

Figure 14A:
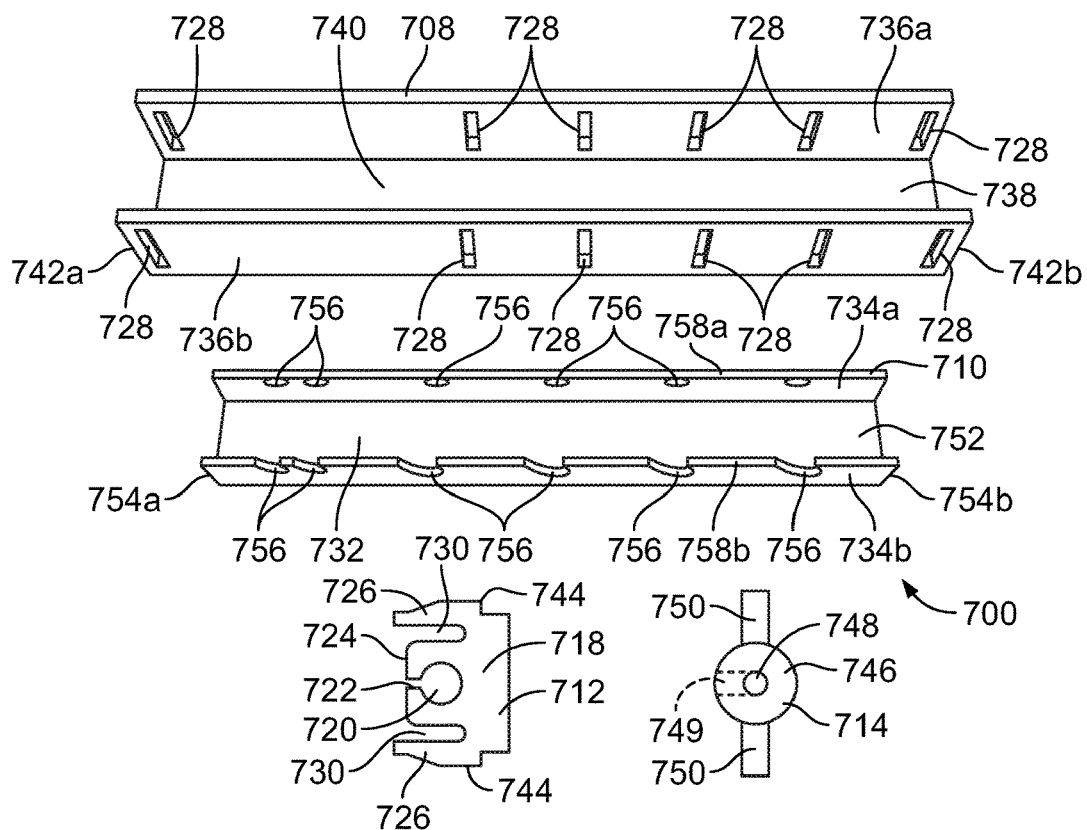
FIG. 14A illustrates top perspective view of components of an exemplary embodiment of at least a portion of an incremental adjuster.
Figure 14B:
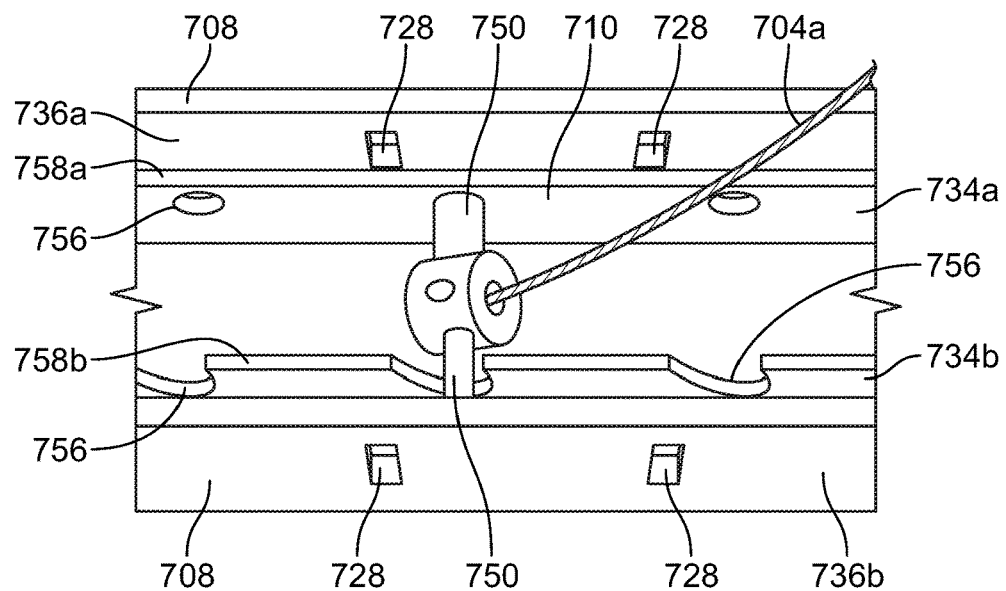
FIG. 14B illustrates top perspective view of cable clip securely coupled to a cable of a cable system and adjustably positioned in the assembled incremental adjuster shown in FIG. 14A.
Figure 14C:
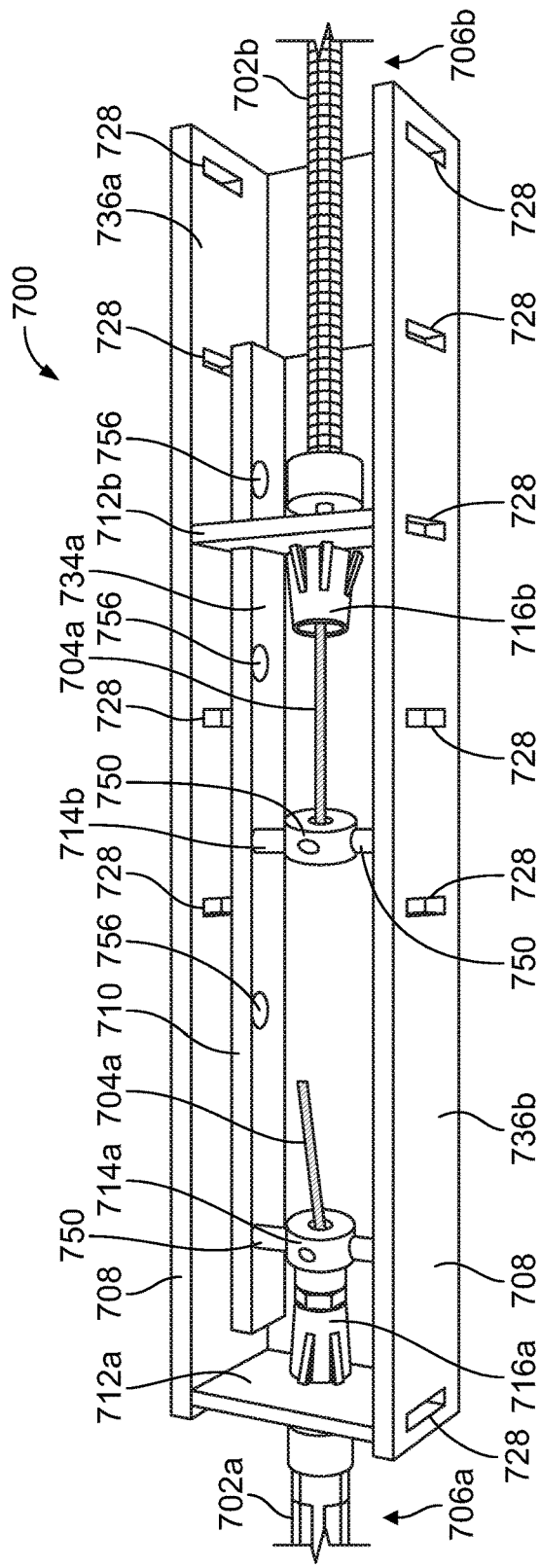
FIG. 14C illustrates a top side perspective view of the assembled incremental adjuster shown in FIG. 14A coupled to both the conduits and cables of first and second cable systems.

FIGS. 14A-14C illustrate an incremental adjuster 700 that maintains the relationship between a conduit 702a, 702b and a core wire 704a, 704b that extends within the conduit 702a, 702b of one or more cable systems 706a, 706b. As previously discussed, while reference is made herein to a core wire 704a, 704b for at least purposes of illustration, core wire 704a, 704b can also include cable, rope, or wire rope, including, but not limited to, organic or synthetic semi-flexible braided material.

According to some embodiments, the incremental adjuster 700 provides adjustment in the relative positions of at least two cable systems 706a, 706b so as to accommodate changes in relative positions of the one or more systems the core wire(s) 704a, 704b is/are interfacing. For example, in order to often maintain the same functional relationship, whenever two systems of an exit device 100 including, for example, but not limited to, latch assemblies, among other types of components or assemblies, of exit devices, move closer or farther to/from each other, a size, such as length, of the core wire(s) 704a, 704b may need adjustment, such as lengthened or shortened, in a manner that is generally proportional to the change in distance between the systems. In some embodiments, such changes in the distance between systems can be accommodated, to an extent, through the use of conduits 702a, 702b that are rigidly fixed to each system, and moreover by the conduit(s) 702a, 702b bowing outwardly or coiling up so that the conduit 702a, 702b and core wire 704a, 704b that moves therein can have a degree of range. However, the degree to which conduits 702a, 702b can bow or coil can be limited, for example, to the available space for such movement of the conduits 702a, 702b. Further, such bowing or coiling can result in an increase in friction in the operation of the cable system 706a, 706b that can decrease the mechanical efficiency of the cable system 706a, 706b.

The incremental adjuster 700 can accommodate changes in the position in such systems by accommodating adjustments, in discrete amounts, of at least the relative linear positions of one or more cable systems 706a, 706b, and moreover can accommodate linear adjustments in generally the same amount or degree in both the conduit 702a, 702b and the associated core wire 704a, 704b of the cable systems 706a, 706b. Referencing FIG. 14A, according to the illustrated embodiment, the incremental adjuster 700 can include a conduit ladder 708, cable ladder 710, and one or more conduit clips 712. Further, according to some embodiments, the incremental adjuster 700 can also include one or more cable clips 714. Further, according to some embodiments, a conduit clip 712 and a cable clip 714 can be provided for a conduit 702a, 702b and a core wire 704a, 704b of each cable system 706a, 706b that is coupled to the incremental adjuster 700.

The conduit clip 712 is configured to securely or lockingly engage at least a portion of the conduit 702a, 702b or a fitting 716a, 716b (FIG. 14C) connected to the conduit 702a, 702b, and to selectively and securely engage the conduit ladder 708. The conduit clip 712 can have a variety of shapes and sizes. According to some embodiments, the conduit clip 712 can include a body portion 718 through which an orifice 720 extends, with the orifice 720 being sized to receive passage of at least a portion of a conduit 702a, 702b and/or a portion of an fitting 716a, 716b that is coupled to the conduit 702a, 702b, such as, for example, a conduit adapter 190, as shown in FIG. 14C. Further, according to some embodiments, a size of the orifice 720, such as, for example, a diameter, may be at least temporarily adjustable, such as, for example, via deformation, bending, pivoting, or deflection of at least a portion of the body portion 718 so as to accommodate the passage of the end fitting 716a, 716b, or another portion of the conduit 702a, 702b, through the orifice 720. For example, according to some embodiments, a slot or opening 722 may extend from the orifice 720 to an edge 724 of the body portion 718 that can accommodate at least temporary expansion of the orifice 720 so that a fitting 716a, 716b can pass therethough and/or be at least partially positioned in the orifice 720 in a manner that secures the conduit clip 712 to the fitting 716a, 716b, and thus to the conduit 702a, 702b. According to some embodiments, the fitting 716a, 716b can include projections that can be inwardly bent or deformed to accommodate passage of at least a portion of the fitting 716a, 716b into and through the orifice 720 in a first direction, but which provide at least a degree of resistance to the return passage of the fitting 716a, 716b back through the orifice 720 in a second direction, the second direction generally being a direction that is opposite the first direction. Further, according to some embodiments, the orifice 720 and/or fitting 716a, 716b can be configured to accommodate a snap, interference, or press fit therebetween. Alternatively, or optionally, the fitting 716a, 716b and/or conduit clip 712 can be configured to be coupled together via use of a mechanical fastener, such as, for example, a clamp, screw, or pin, among other types of fasteners.

The body portion 718 of the conduit clip 712 can also include one or more extensions 726 that extend from the body portion 718 and which are configured for selective and removable secure engagement with the conduit ladder 708. According to some embodiments, at least one of the extensions 726 can be configured to be at least temporarily deflected, bent, pivoted, and/or otherwise deformed from a first position to a second position to accommodate disengagement of the conduit clip 712 from one or more openings 728 in the conduit ladder 708. Further, at least the extensions 726 may be constructed from a material that provides a degree or elasticity or resiliency so that, following deflection, bending, pivoting, and/or deformation of the extensions 726 to the second position, the extensions 726 can generally return to, or around, the first position.

As shown in at least FIG. 14A, according to the illustrated embodiment, a base portion of the extensions 726 is coupled to the body portion 718, with a gap 730 extending between the other adjacent portions of the extensions 726 and the body portion 718. The gap 730 can have a size, such as, for example, a width, that can accommodate displacement of at least a portion of the extensions 726 as at least a portion of the extensions 726 move between the first and second positions during selective engagement and disengagement of the conduit clip 712 to/from the conduit ladder 708. Further, according to some embodiments, the gap 730 can be sized to receive at least a portion of a sidewall 734a, 734b of the cable ladder 710, and to allow the body portion 718 of the conduit clip 712 to be positioned in an interior region 732 of the cable ladder 710 while also allowing the extensions 726 to extend around 734a, 734b the cable ladder 710 so that the extensions 726 can matingly engage selected openings 728 in the conduit ladder 708, as shown for example, in FIG. 14C.

According to the illustrated embodiment, the conduit ladder 708 is configured to be selectively coupled or otherwise attached to one or more conduit clips 712a, 712b (FIG. 14C), as well as house at least a portion of the cable ladder 710. While the conduit ladder 708 is illustrated at least in FIGS. 14A and 14C as having a generally rectangular shape, the conduit ladder 708 can have a variety of other shapes and configurations that can accommodate incremental adjustments in at least the linear position of one or more of the conduit clips 712a, 712b, and thus associated conduit(s) 702a, 702b that are coupled to the conduit ladder 708 via the conduit clips 712a, 712b.

According to the illustrated embodiment, the conduit ladder 708 includes a first sidewall 736a and a second sidewall 736b that extend in generally the same direction from an interconnecting base wall 738. Further, the first and second sidewalls 736a, 736b and the base wall 738 can generally define an inner region 740 of the conduit ladder 708 that is sized to receive placement of at least a portion of the cable ladder 710 and the conduit clip(s) 712a, 712b. Further, as shown in at least FIG. 14A, according to some embodiments, opposite first and second ends 742a, 742b of the conduit ladder 708 can be generally open in that sidewalls need not extend between the first and second sidewalls 736a, 736b, which may in turn improve the ease with which cable ladder 710 and the conduit clip(s) 712a, 712b may be positioned or adjusted therein, as well as the ease of removal of at least those components from the incremental adjuster 700.

According to the illustrated embodiment, the first and second sidewalls 736a, 736b of the conduit ladder 708 can have a plurality of openings 728 that are sized to receive selective insertion of at least a portion of the extensions 726 of the conduit clip 712, such as, for example, insertion of a tab 744 that extends from an outer edge of the extensions 726, as shown in FIG. 14A. The openings 728 can be arranged in pairs such that an opening 728 that is generally at a position along one of the first and second sidewalls 736a, 736b is at a location that that generally corresponds to the location of another opening 728 in the other of the first or second sidewall 736a, 736b. Additionally, according to some embodiments, the number of openings 728 at one end 742a of the sidewalls 736a, 736b may be different than the number of openings 728 generally at or around the other end 742b of the first and second sidewalls 736a, 736b. Such a configuration may allow a first conduit clip 712a (FIG. 14C) that is attached to one cable system 706a to remain at relatively the same location relative to at least conduit ladder 708 during at least relative adjustment of the cable systems 706a, 706b. In such an embodiment, adjustments in the relative positions of at least the conduits 702a, 702b of the cable systems 706a, 706b can at least be made by adjusting the openings 728 in which the other one of the conduit clips 712b is engaged. Alternatively, according to other embodiments, rather than having a first removable conduit clip 712a that remains at a relative static position relative to the conduit ladder 708, the conduit ladder 708 can be formed, such as molded, to include a generally integral or fixed-position conduit clip 712a for attachment of one of the cable systems 706a, 706b.

The cable clip 714 is configured to securely or lockingly engage the core wire 704a, 704b of a cable system 706a, 706b, and to selectively engage the cable ladder 710 at a selected position. The cable clip 714 includes a body portion 746 having an orifice 748 that is sized to receive insertion of a core wire 704a, 704b. The cable clip 714 can be configured to selectively lockingly engage or clamp onto the core wire 704a, 704b in a variety of manners so as to retain at least a linear position of the cable clip 714 relative to the core wire 704a, 704b. For example, according to some embodiments, the cable clip 714 can include a hole 749 in communication with the orifice 748 and which can be threaded so as to receive a set screw or other mechanical fastener that can be tightened against at least a portion of the core wire 704a, 704b that is positioned in the orifice 748. According to such an embodiment, adjustment of at least the relative positions of the set screw and core wire 704a, 704b can be attained by loosening the set screw (if tightened), adjusting at least the relative linear positions of the core wire 704a, 704b and the cable clip 714, and tightening (or re-tightening) the set screw. However, as discussed above, other manners of retaining the relative linear positions of the cable clip 714 and core wire 704a, 704b can also be employed.

The cable clip 714 can also include a pair of arms 750 that extend from opposite sides of the body portion 746 of the cable clip 714. Each of the arms 750 can have similar or dissimilar shapes, sizes, and/or configurations. Further, the arms 750 can be configured to mate with openings 756, such as holes, slots, and/or grooves, in opposite sides of the cable ladder 710, as discussed below. According to the illustrated embodiment, the arms 750 can have generally cylindrical configurations. Further, according to some embodiments, the arms 750 can have generally circular cross sectional shapes that can accommodate rotational displacement of the cable clip 714 when the arms 750 are securely engaged with the cable ladder 710.

The cable ladder 710 is sized to be at least partially positioned within the inner region 740 of the conduit ladder 708 and to matingly engage the arms 750 of the cable clip(s) 714a, 714b. According to the illustrated embodiment, the cable ladder 710 includes a first sidewall 734a and a second sidewall 734b that extend in generally the same direction from an interconnecting base wall 752. Further, the first and second sidewalls 734a, 734b and the base wall 752 of the cable ladder 710 can generally define an interior region 732 of the cable ladder 710 that is sized to receive placement of the cable clip(s) 714a, 714b and possibly at least a portion of the fitting 716a, 716b of the conduits 702a, 702b. Further, as shown in at least FIG. 14A, according to some embodiments, opposite first and second ends 754a, 754b of the cable ladder 710 can be generally open in that sidewalls need not extend between the first and second sidewalls 734a, 734b, which may in turn improve the ease with which at least a portion of the fitting 716a, 716b of the conduits 702a, 702b and/or the cable clip(s) 714a, 714b may be positioned or adjusted therein, as well as the ease of removal of at least those components of the incremental adjuster 700.

According to the illustrated embodiment, the first and second sidewalls 734a, 734b of the cable ladder 710 can have a plurality of openings 756 that are sized to selectively receive insertion of at least a portion of the arms 750 of the cable clip(s) 714a, 714b. The openings 756 can be arranged in pairs such that an opening 756 that is generally at a position along one of the first and second sidewalls 734a, 734b generally corresponds to the location of another opening 756 in the other of the first or second sidewall 734a, 734b. Further, the openings 756 in the first and second sidewalls 734a, 734b can have similar or different shapes and/or sizes. For example, according to some embodiments, the openings 756 in the first sidewall 734a can be generally circular shaped holes that may break through an upper edge 758a of the first sidewall 734a, while the openings 756 along the second sidewall 734b can be grooves, slots, or elongated openings that extend or break through an upper edge 758b of the second sidewall 734b. Further, the openings 756 of the second sidewall 734b can be elongated in an angled direction that is not perpendicular to the surface of the upper edge 758b of the second sidewall 734b and/or is not perpendicular to the base wall 752. The openings 756 of the first and second sidewalls 734a, 734b can, however, have a variety of other shapes and configurations, as well as combinations thereof.

Additionally, similar to the conduit ladder 708, according to some embodiments, the number and/or the shape of the openings 756 at one end 754a of the sidewalls 734a, 734b of the cable ladder 710 may be different than the number, size and/or shape of the openings 756 generally at or around the other end 754b of the first and second sidewalls 734a, 734b of the cable ladder 710. As shown in FIG. 14C, such a configuration may allow a first cable clip 714a (FIG. 14C) that is attached to a cable system 706a and which is operably engaged with the first conduit clip 712a to remain at relatively the same location relative to at least the cable ladder 710 and/or the conduit ladder 708. In such an embodiment, adjustments in the relative positions of at least the core wires 704a, 704b of the cable systems 706a, 706b, and/or relative adjustments between the cable systems 706a, 706b, can at least be made at least in part by adjusting the openings 756 in the cable ladder 710 in which the other one of the cable clips 714 is engaged, such as, for example, by adjusting the openings 756 that a second cable clip 714b (FIG. 14C) engages in the cable ladder 710. Further, according to such an embodiment, rather than having a first removable cable clip 714a that remains at a relative static position relative to the cable ladder 710, the cable ladder 710 can be formed or molded to include a generally integral or fixed-position cable clip 714a.

During use, a first conduit clip 712a can be engaged with a fitting 716a or other portion of a conduit 702a of a first cable system 706a and secured in a single pair of openings 728 at a first end 742a of the conduit ladder 708. Further, the core wire 704a of the first cable system 706a can be securely engaged with a first cable clip 714a and be inserted into a single pair of openings 756 that are located at a first end 754a of the cable ladder 710. A second cable clip 714b can also be secured to the core wire 704b of a second cable system 706b and selectively positioned to securely engage a pair of opposite openings 756 of the cable ladder 710. The second conduit clip 712b can also be engaged with the fitting 716b or other portion of the conduit 702b of the second cable system 706b. The second conduit clip 712b can be selectively secured to the conduit ladder 708 via engagement of the extensions(s) with openings 728 in the conduit ladder 708. Further, the openings 728 of the conduit ladder 708 selected for engagement may be those openings 728 that cause at least the conduits 702a, 702b of the first and second cable systems 706a, 706b to be relatively taut, and moreover, that reduce or eliminate excessive and/or unnecessary slack in the cable systems 706a, 706b.

According to some embodiments, each pair of openings 756 of the cable ladder 710 and each pair of openings 728 in the conduit ladder 708 can correspond to a particular position of at least one cable system 706b relative to the incremental adjuster 700. For example, the third pair of openings 756 from an end 754b of the cable ladder 710 and a third pair of openings 728 from an end 742b of the conduit ladder 708 can correspond to a third position of the associated cable system 706b relative to the incremental adjuster 700. Thus, according to some embodiments, the pair openings 756 in which the second cable clip 714b is selected for securing to the cable ladder 710 may correspond to the pair of openings 728 in the conduit ladder 708 to which the associated conduit clip 712b is, or is to be, secured.

With the conduits 702a, 702b of the cable systems 706a, 706b each secured to the conduit ladder 708, the conduits 702a, 702b, and conduit ladder 708 can function as a first semi-rigid unit with constant length, making the conduits 702a, 702b act as a common ground. Similarly, with the core wires 704a, 704b of the cable systems 706a, 706b each secured to the cable ladder 710, the core wires 704a, 704b and cable ladder 710 can function as a second semi-rigid unit having a constant length, and making core wires 704a, 704b act as a single core wire. Accordingly, when an input force causes one of the core wires 704a to be actuated, the associated force can be transmitted through the core wires 704a, 704b and cable ladder 710 as if the core wires 704a, 704b and cable ladder 710 were a single, nonadjustable core wire.

While the invention has been described in connection with what is presently considered to be the most practical and preferred embodiment, it is to be understood that the invention is not to be limited to the disclosed embodiment (s), but on the contrary is intended to cover various modifications and equivalent arrangements included within the spirit and scope of the appended claims, which scope is to be accorded the broadest interpretation so as to encompass all such modifications and equivalent structures as permitted under the law.

Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An apparatus, comprising:
an inner conduit having an inner aperture;
an outer conduit having an outer aperture sized to accommodate telescopic displacement of at least a portion of the inner conduit within at least a portion of the outer aperture;
a core wire extending through the inner aperture and at least a portion of the outer aperture, a first end of the core wire extending from a first end of the outer conduit, a second end of the core wire extending from a second end of the inner conduit, one of the first and second ends of the core wire coupled to a first connector; and
a conduit locking device structured to selectively secure an axial position of the inner conduit relative to the outer conduit; and
wherein the conduit locking device is configured and positioned for secure attachment of a portion of the conduit locking device to a portion of the inner conduit that extends outside of the outer conduit.

2. The apparatus of claim 1, wherein the conduit locking device is structured to exert a first compressive force that is transmitted to an outer surface of the inner conduit to secure the axial position of the inner conduit relative to the outer conduit, and wherein the conduit locking device is coupled to the outer conduit.

3. The apparatus of claim 2, wherein the conduit locking device includes a first locking segment and a second locking segment, the first locking segment having a first compression segment and an orifice, the orifice defined by an inner wall of the first locking segment and sized to receive placement of at least a portion of the inner conduit, the first compression segment configured for engagement with the second locking segment to facilitate formation of the first compressive force.

4. The apparatus of claim 3, wherein the first locking segment includes a first extension that is coupled to a portion of an inner surface of a first wall of the outer conduit, the inner surface defining the outer aperture.

5. The apparatus of claim 2, wherein the conduit locking device comprises a clamp positioned about an outer surface of the outer conduit, and wherein the first compressive force reduces at least a portion of the outer aperture in which the inner conduit is positioned from a first size to a second size.

6. The apparatus of claim 5, wherein the clamp includes a first clamp portion and a second clamp portion, the first clamp portion coupled to the second clamp portion by an arm, the arm structured to retain an axial position of the first clamp portion relative to an axial position of the second clamp portion.

7. An apparatus, comprising:
an inner conduit having an inner aperture;
an outer conduit having an outer aperture sized to accommodate telescopic displacement of at least a portion of the inner conduit within at least a portion of the outer aperture;
a core wire extending through the inner aperture and at least a portion of the outer aperture, a first end of the core wire extending from a first end of the outer conduit, a second end of the core wire extending from a second end of the inner conduit, one of the first and second ends of the core wire coupled to a first connector; and
a conduit locking device structured to selectively secure an axial position of the inner conduit relative to the outer conduit,
wherein one of the first or second ends of the core wire is coupled to a second end fitting, the second end fitting having a first fitting portion and a second fitting portion, the first fitting portion having a cavity sized to receive placement of at least one of the first and second ends of the core wire, the first fitting portion configured for engagement with the second fitting portion to create a second compressive force against the core wire, and wherein the second fitting includes a second connector.

8. The apparatus of claim 7, wherein the core wire includes a plurality of beads, each of the plurality of beads separated from an adjacent bead by a space, and wherein the first fitting portion includes a pocket sized to receive at least one bead of the plurality of beads, the pocket being in communication with the cavity.

9. The apparatus of claim 7, wherein at least one end of each of the inner and outer conduits is coupled to a conduit adapter, a portion of the conduit adapter structured for engagement with an adjacent component to retain a relative axial position of the inner and outer conduits.

10. An apparatus, comprising:
an inner conduit having an inner aperture;
an outer conduit having an outer aperture sized to accommodate telescopic displacement of at least a portion of the inner conduit within at least a portion of the outer aperture;
a core wire extending through the inner aperture and at least a portion of the outer aperture, a first end of the core wire extending from a first end of the outer conduit, a second end of the core wire extending from a second end of the inner conduit, one of the first and second ends of the core wire coupled to a first connector; and
a conduit locking device structured to selectively secure an axial position of the inner conduit relative to the outer conduit,
further comprising an end fitting structured for locking engagement to the core wire, the end fitting including one or more apertures extending through the end fitting and positioned to accommodate receipt of an end of the core wire through a first opening of the one or more apertures, as well as passage of an end of the core wire out from the one or more apertures and the end fitting through a second opening, the second opening being positioned at a different location than the first opening.

11. An apparatus, comprising:
a conduit system comprising at least a first conduit telescopically coupled to a second conduit, an axial length of the conduit system being adjustable between a first axial length and a second axial length;
a core wire extending through the conduit system, a first end of the core wire coupled to a first connector; and
a conduit locking device structured to selectively secure the conduit system at one of a plurality of axial lengths between the first and second axial lengths, inclusive; and
wherein the conduit locking device is configured and positioned for secure attachment of a portion of the conduit locking device to a portion of the first conduit that extends outside of the second conduit.

12. An apparatus, comprising:
a conduit system comprising at least a first conduit telescopically coupled to a second conduit, an axial length of the conduit system being adjustable between a first axial length and a second axial length;
a core wire extending through the conduit system, a first end of the core wire coupled to a first connector;
a conduit locking device structured to selectively secure the conduit system at one of a plurality of axial lengths between the first and second axial lengths, inclusive; and
an end fitting adapted to be coupled to a second end of the core wire, the end fitting including a second connector, wherein the end fitting comprises a threaded collet connector.

13. The apparatus of claim 12, wherein the conduit locking device comprises a friction clamp.

14. The apparatus of claim 12, wherein at least a first end of the second conduit is selectively displaceable within a first aperture of the first conduit, and wherein a second end of the second conduit extends away from, and outside of, a second end of the first conduit, the distance between the second ends of the first and second conduits at the second axial length being greater than when the conduit system is at the first axial length.

15. The apparatus of claim 14, wherein the conduit locking device is structured to exert a compressive force that is transmitted to an outer surface of the second conduit to secure the axial position of the second end of the second conduit relative to the second end of the first conduit, and wherein the conduit locking device is coupled to the first conduit.

16. The apparatus of claim 15, wherein the core wire includes a plurality of radially-extending beads, each of the plurality of radially-extending beads separated from an adjacent radially-extending bead by a space, and wherein the end fitting includes a pocket sized to receive insertion of at least one radially-extending bead of the plurality of radially-extending beads.

17. An apparatus, comprising:
a first conduit having a first wall, a first end, and a second end, the first wall having an outer surface and an inner surface, the inner surface defining an first aperture, a first end of the first conduit coupled to a first conduit adapter;
a second conduit having a second wall, a first end, and a second end, at least a portion of the second wall adjacent to the first end of the second conduit sized for slideable displacement along the first aperture, the second end of the second conduit coupled to a second conduit adapter;
a conduit locking device coupled to the first end of the first conduit and structured to secure an axial position of the second conduit relative to the first conduit; and
a core wire extending through the first and second conduits, a first end of the core wire extending beyond the first end of the first conduit, a second end of the core wire extending beyond the second end of the second conduit; and
wherein the conduit locking device is directly attached to the first end of the first conduit and structured for releasable secure engagement with a portion of the second conduit that is outside of the first conduit to secure an axial position of the second conduit relative to the first conduit.

18. The apparatus of claim 17, wherein at least one of the first and second ends of the core wire is coupled to an end fitting, the end fitting having a connector adapted to couple the core wire to at least one of a latch, a latch assembly, and an exit device.

19. The apparatus of claim 18, wherein the core wire includes a plurality of radially-extending beads, each of the plurality of radially-extending beads separated from an adjacent radially-extending bead by a space, and wherein the end fitting includes a pocket sized to receive insertion of at least one radially-extending bead of the plurality of radially-extending beads.

* * * * *